(12) United States Patent
Koga et al.

(10) Patent No.: US 8,662,600 B2
(45) Date of Patent: Mar. 4, 2014

(54) WORKING VEHICLE WITH ELECTROMAGNETIC BRAKE

(75) Inventors: Kazunari Koga, Hyogo (JP); Hongkun Wang, Hyogo (JP); Jun Matsuura, Hyogo (JP); Kengo Sasahara, Hyogo (JP); Fumitoshi Ishino, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 37 days.

(21) Appl. No.: 13/545,113

(22) Filed: Jul. 10, 2012

(65) Prior Publication Data

US 2013/0015005 A1    Jan. 17, 2013

(30) Foreign Application Priority Data

Jul. 12, 2011 (JP) ................................ 2011-153763

(51) Int. Cl.
*B60T 13/74* (2006.01)
(52) U.S. Cl.
USPC .................................. 303/3; 56/10.6; 56/10.8
(58) Field of Classification Search
USPC ........... 303/3, 15, 20, 152, 155; 56/10.6, 10.8
See application file for complete search history.

(56) References Cited

U.S. PATENT DOCUMENTS

| 6,948,299 B2* | 9/2005 | Osborne ........................ 56/10.8 |
| 8,130,478 B2* | 3/2012 | Godbold et al. ................ 361/33 |
| 2002/0104300 A1* | 8/2002 | Hunt ............................. 56/10.6 |
| 2006/0170184 A1* | 8/2006 | Lan et al. ..................... 280/264 |

FOREIGN PATENT DOCUMENTS

| JP | 9-210106 A | 8/1997 |
| JP | 2006-507789 A | 3/2006 |
| WO | 2004/057166 A3 | 7/2004 |

* cited by examiner

*Primary Examiner* — Christopher Schwartz
(74) *Attorney, Agent, or Firm* — Cantor Colburn LLP

(57) ABSTRACT

A lawnmower vehicle which is a working vehicle with an electromagnetic brake includes left and right electromagnetic brakes, a brake relay which is a common brake releasing unit, and an ECU. The ECU compares electricity supply states of the left and right electromagnetic brakes, and controls the brake relay to disconnect an electrical connection between a battery and the left and right electromagnetic brakes, and to brake left and right wheels when a difference in the electricity supply states compared by a comparator exceeds an allowable upper limit.

12 Claims, 20 Drawing Sheets

WORKING VEHICLE WITH ELECTROMAGNETIC BRAKE

PRIORITY INFORMATION

This application claims priority to Japanese Patent Application No. 2011-153763 filed on Jul. 12, 2011, which is incorporated herein by reference in its entirety.

BACKGROUND

1. Technical Field

The present invention relates to a working vehicle with an electromagnetic brake which has left and right wheels, a working machine, and left and right electromagnetic brakes provided corresponding to the left and right wheels.

2. Related Art

In the related art, ground working vehicles having working machines which are driven for ground work such as lawnmowing work and cultivating are known. In addition, in such ground working vehicles, electricity-driven ground working vehicles are considered having left and right wheels which are main drive wheels independently driven for travel by a motor such as an electric motor and a hydraulic motor, and steering wheels such as caster wheels.

For example, as a working vehicle, there exists a lawnmower vehicle equipped with a lawnmower which is a working machine, on which a worker rides for operations of traveling and lawnmowing, and which can travel by itself. Such a lawnmower vehicle is commonly called a riding type lawnmower vehicle. As the lawnmower, for example, there exists a lawnmowing rotary tool or the like. The riding type lawnmower vehicle is principally used off road, such as in a garden, and moves on the ground surface for the lawnmowing work.

For example, JP 2006-507789 A discloses a hybrid motive power unit equipped with an engine-generator integrated structure in which a rotor of a generator is connected to an engine shaft of an internal combustion engine. In a lawnmower exemplified as the motive power unit, electric motors are connected independently to a plurality of drive wheels and the drive wheels can be independently controlled with variable velocities so that starting, stopping, changing of a velocity, and changing of a direction of the lawnmower can be realized. As an example of turning by an independent change of the velocities of the drive wheels, a structure is described in which electric motors are connected to left and right rear wheels. As related art documents related to the present invention, in addition to JP 2006-507789 A, there exists JP H9-210106 A.

In the lawnmower vehicle in which left and right wheels are driven by left and right motors which are independent, as described in JP 2006-507789 A, a configuration may be considered in which left and right electromagnetic brakes are provided for braking the left and right wheels, to realize a working vehicle with an electromagnetic brake. In addition, in a working vehicle with an electromagnetic brake, a configuration may be considered which employs left and right electromagnetic brakes in which a brake releasing operation of the left and right wheels is executed by supplying electricity from a power supply and a brake operation of the left and right wheels is executed by cutting the supply of electricity from the power supply. Moreover, a configuration may be employed in which, in order to simultaneously brake the left and right wheels by the left and right electromagnetic brakes, a common switching unit is provided for the left and right electromagnetic brakes for switching the supply and cutting-off of the electricity between the left and right electromagnetic brakes and the power supply. However, there is a possibility that, when abnormality occurs in only one of the electromagnetic brakes, such as a case where the electricity is supplied to only the other the electromagnetic brake among the left and right electromagnetic brakes due to occurrence of abnormality in the circuits including the power supply and electromagnetic brakes, such as line disconnection, or occurrence of abnormality in the braking unit of one of the electromagnetic brakes among the left and right electromagnetic brakes when the electricity is to be supplied to the left and right electromagnetic brakes from the power supply, the vehicle turns in a manner not intended by the driver. For example, when one of the electromagnetic brakes is supplied with electricity from the power supply but the other electromagnetic brake is not supplied with electricity from the power supply, a difference may be caused in the traveling states of the left and right wheels. In this case, the vehicle may turn in some direction, and may move in a direction not intended by the driver. Because of this, there is a room for improvement in the point of effectively preventing the turn unintended by the driver even when abnormality occurs in one of the left and right electromagnetic brakes.

In consideration of this, JP H9-210106 A discloses an abnormality diagnosis device of a magnetic brake which is operated by a brake power supply circuit, which detects a current value supplied from the brake power supply circuit to a coil of the brake, extracts, from an amplified detected signal, a signal which allows understanding of an operation state of the brake, then compares the extracted value with a stored judgment value, and judges an operation deficiency of an armature of the brake. However, JP H9-210106 A only discloses a device which judges an operation deficiency of the armature, and does not disclose a unit which effectively prevents turning unintended by the driver even when abnormality occurs in one electromagnetic brake among the left and right electromagnetic brakes.

An advantage of the present invention is that in a working vehicle with electromagnetic brake, turning unintended by the driver is effectively prevented even when abnormality occurs in one electromagnetic brake among the left and right electromagnetic brakes.

SUMMARY

According to one aspect of the present invention, there is provided a working vehicle with an electromagnetic brake, comprising a left wheel and a right wheel which are drive wheels driven for travel by a left traction motor and a right traction motor, respectively, a working machine which is driven for executing ground work, a left electromagnetic brake and a right electromagnetic brake provided corresponding to the left wheel and the right wheel, respectively, and which execute a brake release operation of the left wheel and the right wheel by supply of electricity from a power supply and execute a brake operation of the left wheel and the right wheel when the supply of electricity from the power supply is cut off, a common brake releasing unit which is common to the left electromagnetic brake and the right electromagnetic brake and which electrically connects the power supply and the left electromagnetic brake and the right electromagnetic brake to supply electricity from the power supply to the left electromagnetic brake and the right electromagnetic brake when a brake releasing instruction is obtained, and a controller which controls the common brake releasing unit, wherein the controller compares electricity supply states of the left electromagnetic brake and the right electromagnetic brake, and controls the common brake releasing unit to disconnect an electrical connection between the power supply and the left electromagnetic brake and the right electromagnetic brake and to brake the left wheel and the right wheel when a difference between the compared electricity supply states exceeds an allowable upper limit. In the above-described configuration of the present invention, the traction motor may be, in addition to an electric motor, a hydraulic motor or the like.

BRIEF DESCRIPTION OF THE DRAWINGS

FIGS. 7(A)-7(D) are diagrams showing example changes with respect to time in a lawnmower vehicle which is a working vehicle with an electromagnetic brake according to a second embodiment of the present invention, wherein: FIG. 7(A) shows an example change with respect to time of a coil current of a right electromagnetic brake during normal time; FIG. 7(B) shows an example change with respect to time of a brake stroke of the right electromagnetic brake during the normal time; FIG. 7(C) shows an example change with respect to time of a coil current of a left electromagnetic brake during occurrence of abnormality; and FIG. 7(D) shows an example change with respect to time of a brake stroke of the left electromagnetic brake during occurrence of abnormality.

DESCRIPTION OF EXEMPLARY EMBODIMENTS

[First Embodiment]

Embodiments of the present invention will now be described in detail with reference to the drawings. In the following description, as a working vehicle with an electromagnetic brake, a lawnmower vehicle having a lawnmower as a working machine will be described, but the working vehicle with an electromagnetic brake according to the present invention is not limited to such a structure. For example, the working vehicle with an electromagnetic brake may be a vehicle having, as the working machine, a working machine which executes work with respect to the ground, that is, ground work such as, for example, a cultivating machine, a seedling planting machine, a soil grading machine, an excavation machine, etc.

Figure 1:
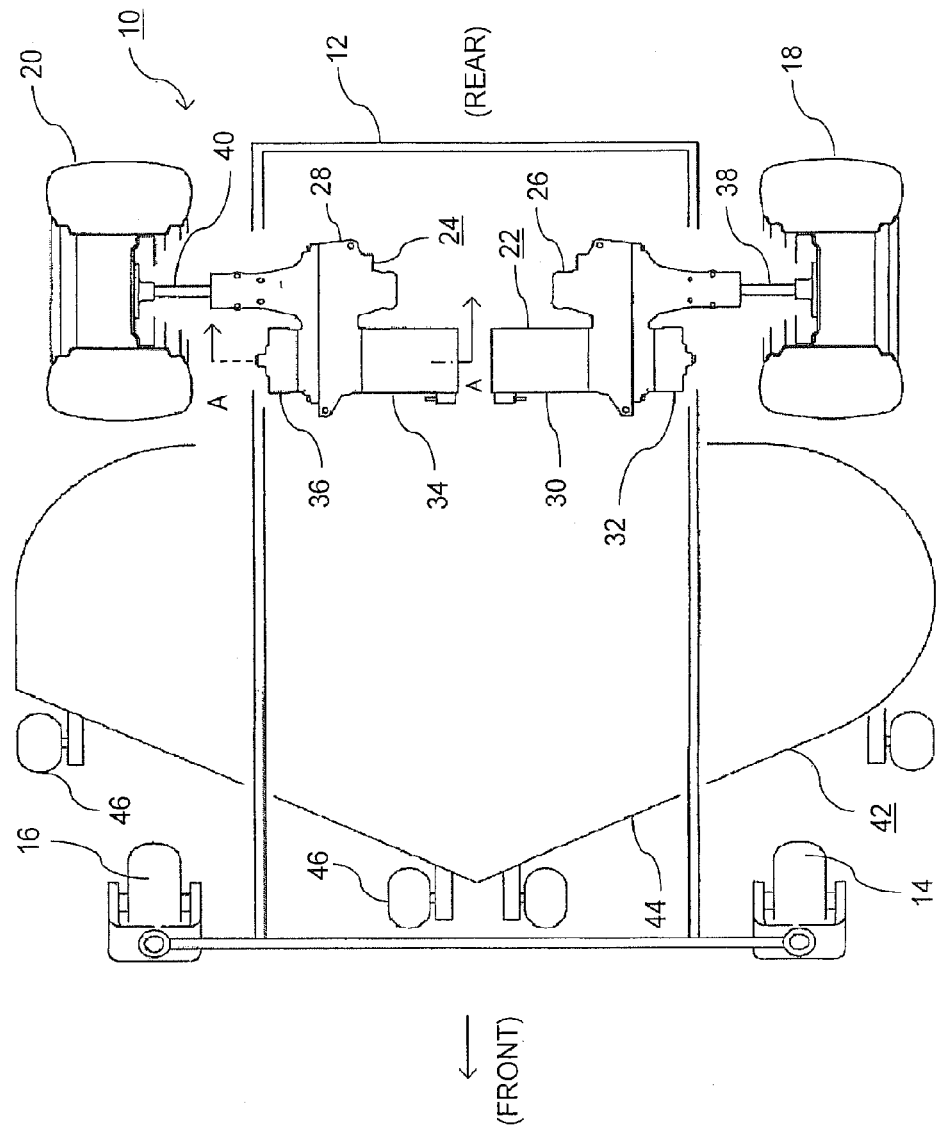
FIG. 1 is a schematic diagram showing, from above, a structure of a lawnmower vehicle which is a working vehicle with an electromagnetic brake according to a first embodiment of the present invention.

FIGS. 1-6 show a first embodiment of the present invention. As shown in FIG. 1, a lawnmower vehicle 10 which is a working vehicle with an electromagnetic brake and which is also a riding type ground working vehicle is a self-traveling off-road vehicle suited for lawnmowing. Two, left and right caster wheels 14 and 16 and two, left and right wheels 18 and 20 are supported and provided at positions set apart in the forward/backward direction (left/right direction of FIG. 1) of a main frame 12 which is the vehicle body. The left and right caster wheels 14 and 16 are front wheels and are also steering wheels. The two left and right wheels 18 and 20 are rear wheels and are also main drive wheels. The left and right wheels 18 and 20 are respectively independently driven for travel by left and right power generation units 22 and 24 provided on the respective sides of the left and right wheels 18 and 20.

The left power generation unit 22 includes a motive power transmission mechanism (not shown) including a gear or the like within a casing 26, and a motor casing of a traction motor 30 which is a left electric motor is fixed on the casing 26. A brake casing of a left electromagnetic brake 32 is fixed on a side of the casing 26 opposite of the left traction motor 30.

Similarly, the right power generation unit 24 includes a motive power transmission mechanism (not shown) including a gear or the like within a casing 28, and a motor casing of a traction motor 34 which is a right electric motor is fixed on the casing 28. In addition, a brake casing of a right electromagnetic brake 36 is fixed on a side of the casing 28 opposite to the right traction motor 34. In the configuration exemplified in the drawings, the traction motors 30 and 34 are placed near a center in the width direction (upward/downward direction of FIG. 1) of the vehicle, and the electromagnetic brakes 32 and 36 are placed on an outside in the width direction of the vehicle. In addition, the traction motors 30 and 34 and the electromagnetic brakes 32 and 36 are placed at positions nearer to the front (left side of FIG. 1) than axles 38 and 40 connected and fixed on the wheels 18 and 20 and protruding from the casings 26 and 28 of the power generation units 22 and 24. Because two electromagnetic brakes 32 and 36 are placed separated at the left and the right, the degree of freedom of the layout and assembly can be improved. Alternatively, unlike the example configuration of FIG. 1, the left and right electromagnetic brakes 32 and 36 may be placed in a single, common casing, and the casing may be supported on the main frame 12.

Alternatively, unlike the example configuration of FIG. 1, the side in the front/rear direction on which the traction motors 30 and 34 and the electromagnetic brakes 32 and 36 are placed with respect to the axles 38 and 40 may be reversed for the left and right power generation units 22 and 24. In this case, the positions of the traction motors 30 and 34 near the center in the width direction of the vehicle can be shifted with respect to the front/rear direction, and therefore, the space between the power generation units 22 and 24 may be reduced.

To the wheels 18 and 20, motive power is transmitted from corresponding traction motors 30 and 34 through the motive power transmission mechanisms and axles 38 and 40, and the wheels 18 and 20 are independently driven. By matching the rotational velocities of the left and right wheels 18 and 20 by the traction motors 30 and 34, the vehicle can travel straight forward, and by generating a difference in the rotational velocities of the left and right wheels 18 and 20, the vehicle can turn.

The motive power transmission mechanism may include a reduction mechanism such as, for example, a reduction gear device of one or a plurality of stages. The casings 26 and 28 of the power generation units 22 and 24 are supported on the main frame 12. The caster wheels 14 and 16 can be freely steered through 360 degrees or greater about the axis in the vertical direction (direction of perpendicular of page of FIG. 1). The caster wheels 14 and 16 may be provided in numbers other than 2, for example, only 1, on the lawnmower vehicle 10. Alternatively, three or more caster wheels may be provided on the lawnmower vehicle 10. In addition, although in the present embodiment, the left and right wheels which are the main drive wheels are set as the rear wheels and the caster wheels 14 and 16 are set as the front wheels, alternatively, the left and right wheels 18 and 20 which are the main drive wheels may be set as the front wheels and the caster wheels 14 and 16 may be set as the rear wheels.

As the main frame 12, a metal material such as a steel material may be used, and a structure which is formed in a beam structure or the like may be used. The main frame 12 includes, at its upper side (front side of FIG. 1) a horizontal plate (not shown) provided to cover most of an upper side of the power generation units 22 and 24. A seat (not shown) on which the driver sits is provided above the horizontal plate.

In the present document, the front side refers to a front side of the vehicle which is the left side in FIG. 1, and the rear side refers to a rear side of the vehicle which is the right side in FIG. 1. In addition, the lawnmower vehicle 10 comprises a lawnmower (mower) 42 which is a working machine, and the lawnmower 42 is supported on a lower side of the main frame 12 between the caster wheels 14 and 16 and the wheels 18 and 20 with regard to the front/rear direction. In the lawnmower 42, a lawnmowing blade (not shown) which is a lawnmowing rotary tool is provided at an inner side of a mower deck 44. In addition, an auxiliary wheel 46 is supported on the mower deck 44. The lawnmowing blade has a rotational shaft directed in the vertical direction (direction of perpendicular of the page in FIG. 1), a plurality of blades are placed around the rotational axis, and lawn or the like can be cut and mowed by rotating the blades.

In the lawnmower vehicle 10, a battery 48 (FIG. 2) which is a power supply unit and which is also a secondary battery is supported on an upper side or a lower side of the main frame 12, and electric power of the battery 48 is supplied to the traction motors 30 and 34 so that the traction motors 30 and 34 can be driven. The battery 48 can be charged by receiving supply of electric power from an alternating current power supply or the like which is an external commercial power supply through a connector or the like (not shown).

The lawnmower vehicle 10 may be of a hybrid type, which is equipped with an engine and a power generator (not shown). In this case, the power generator may generate power using the motive power of the engine, and the generated electric power may be supplied to the battery 48. As the power supply unit, besides the battery 48 which receives supply of charging electric power from the outside, a structure having a self-power-generation function such as a fuel cell, a solar cell, or the like may be used. In addition, as the power supply unit, in place of the battery 48, other electricity accumulating units such as a capacitor may be used.

Figure 2:
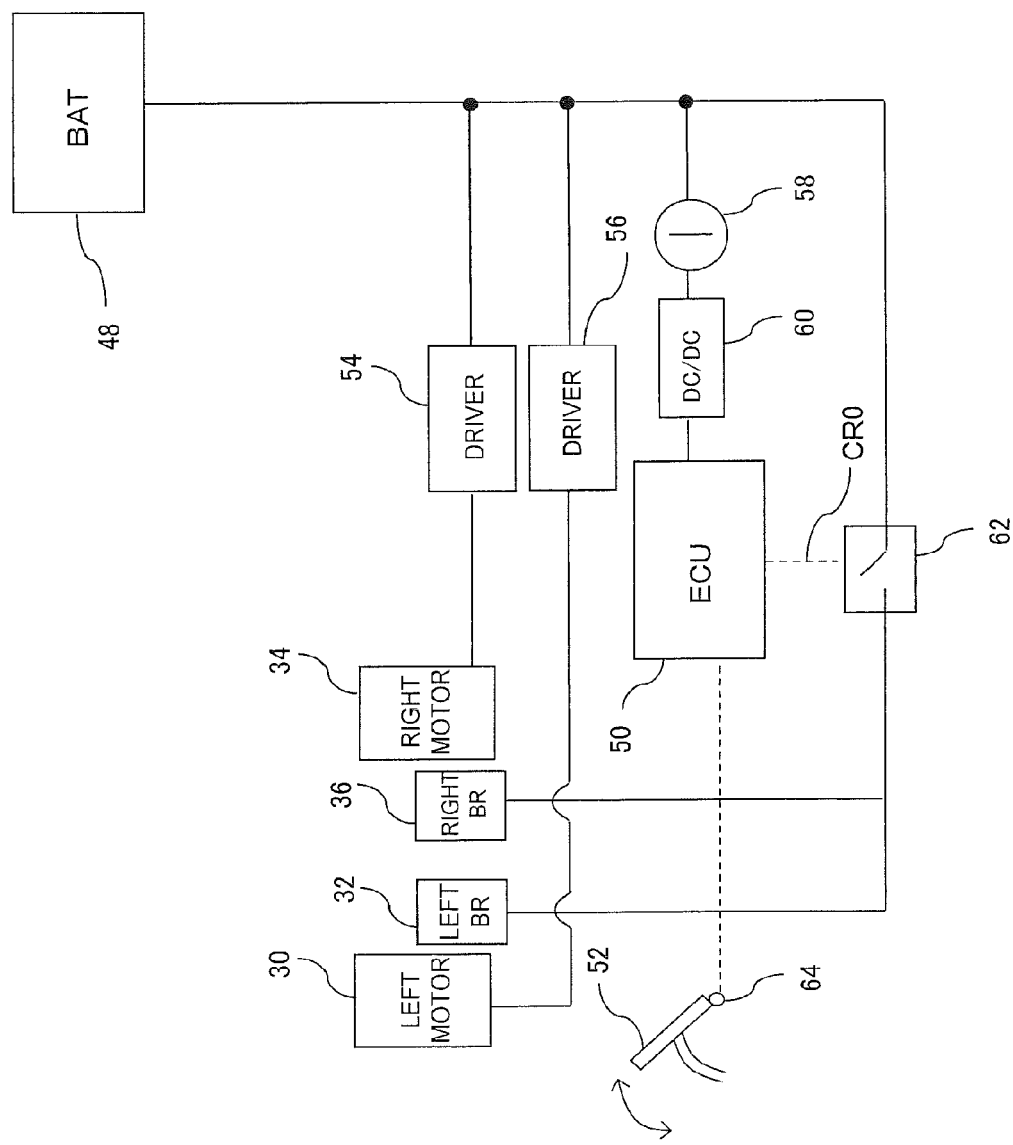
FIG. 2 is a diagram showing a circuit structure of primary portions of the lawnmower vehicle of FIG. 1.

In the lawnmower 42, when a mower switch (not shown) is switched ON, electric power is supplied from the battery 48 shown in FIG. 2. In this case, an ECU (Electronic Control Unit) 50 which is a controller of the lawnmower vehicle 10 receives a signal representing ON/OFF of the mower switch, and controls the operation of the lawnmower 42 (FIG. 1) according to the signal. To a motor for driving the lawnmowing blade of the lawnmower 42, electric power is supplied from the battery 48 through a driver for the mower (not shown). The lawnmower 42 having such a structure is driven for executing ground work.

As shown in FIG. 1, the grass mowed by the lawnmower 42 is discharged from the mower deck 44 to one side or both sides in the width direction of the vehicle. Alternatively, a grass collecting tank (not shown) may be provided on the lawnmower vehicle 10, the grass collecting tank and an end of the mower deck 44 may be connected by a duct (not shown), and a fan provided inside the duct may be driven so that the mowed grass is collected in the grass collecting tank through the duct.

The traction motors 30 and 34 have functions to output rotational driving powers to the wheels 18 and 20 when electric power is supplied from the battery 48 (FIG. 2), but alternatively, a function as a power generator for recovering regenerated energy when wheels 18 and 20 are braked may be provided in the traction motors 30 and 34. The traction motors 30 and 34 are, for example, three-phase synchronous electric motors or induction motors or the like.

As the lawnmowing rotary tool which is the lawnmower, in place of the lawnmowing blade type tool, a lawnmowing reel type tool may be used in which, for example, a spiral blade is placed on a cylinder having a rotational shaft parallel to the ground surface and the grass or the like is sandwiched and mowed.

As shown in FIG. 2, the ECU 50 performs overall control of the operations of the traction motors 30 and 34. Because the ECU 50 is an electronic circuit, the ECU 50 may be placed in a distributed manner at a plurality of locations of the lawnmower vehicle 10. Only one ECU 50 may be provided on the lawnmower vehicle 10 or the ECU 50 may be distributed into a plurality of elements and the plurality of elements may be connected to each other by a signal cable or the like. The ECU 50 includes a control circuit unit having a CPU and a storage unit 76 (FIG. 3) such as a memory. The ECU 50 may alternatively have a structure including the control circuit unit and a driver circuit such as an inverter circuit which drives the traction motors 30 and 34.

On an upper surface side of the main frame 12 shown in FIG. 1, in addition to a seat, a steering operator which is a turn instruction provider (not shown), an accelerator pedal which is an acceleration instruction provider (not shown), and a brake pedal 52 which is a brake instruction provider (FIG. 2) are provided. The steering operator is a steering wheel which can be rotated in one of the left and right directions, an amount of turn instruction which is a steering angle of the steering operator is detected by a steering amount sensor (not shown), and the detected turn instruction amount is output to the ECU 50 as a signal. Alternatively, as the turn operator, a mono-lever type structure may be used. An acceleration instruction amount which is the step-on amount and the operation amount of the accelerator pedal is detected by an acceleration sensor (not shown), and the detected acceleration instruction amount is output to the ECU 50 as a signal. Two accelerator pedals may be provided separately for forward movement and backward movement, or a single accelerator pedal may be provided to instruct forward acceleration by stepping on the front side and to instruct backward acceleration by stepping on the rear side.

Alternatively, as the turning operator, two, left and right levers (not shown) also having a function of the acceleration operator provided separately on the left side and right side of the set may be employed. The left and right levers can move swingably in the front/rear direction, can instruct acceleration in the forward direction of the traction motor 30 (or 34) on the side of the corresponding lever by being pushed forward, and can instruct acceleration in the backward direction of the traction motor 30 (or 34) on the side of the corresponding lever by being pushed backward.

In the lawnmower vehicle 10 having such a structure, when the accelerator pedal is stepped on, the vehicle can be accelerated in the forward direction or the backward direction. In addition, during the operation or non-operation of the accelerator pedal, the steering operator may be steered so that the vehicle can be turned according to the steering direction of the steering operator. For example, when the steering operator is set at a neutral position for instructing the straight movement state and the accelerator pedal of the forward direction is stepped on, the wheels 18 and 20 are rotated in the forward direction. As the amount of step-on is increased, the rotation per unit time of the wheels 18 and 20 are increased and the forward movement velocity is increased. In order to configure in this manner, the ECU 50 (FIG. 2) controls the left and right traction motors 30 and 34 independently according to the input turn instruction amount and acceleration instruction amount. Specifically, as shown in FIG. 2, the ECU 50 outputs a control signal to a driver circuit 54 for the right traction motor 34, to control the driving of the right traction motor 34, and outputs a control signal to a driver circuit 56 for the left traction motor 30, to control the driving of the left traction motor 30.

The battery 48 is connected to the ECU 50 through a main switch 58 and a DC-to-DC converter 60. A voltage of the battery 48 is reduced by the DC-to-DC converter 60 and supplied to the ECU 50. For example, when the voltage of the battery 48 is 48 V, the voltage is reduced by the DC-to-DC converter 60 to 12 V and is supplied to the ECU 50, and the ECU 50 is activated. As shown in FIGS. 1 and 2, for the braking of the lawnmower vehicle 10, the left and right electromagnetic brakes 32 and 36 as described above are provided corresponding to the left and right wheels 18 and 20. The electromagnetic brakes 32 and 36 execute a brake releasing operation of the corresponding wheels 18 and 20 by being supplied of electricity, that is, being supplied of electric power, from the battery 48 which is the power supply, and execute a brake operation of the corresponding wheels 18 and 20 by the supply of electricity from the battery 48 being cut off. Specifically, as shown in FIG. 2, the left and right electromagnetic brakes 32 and 36 are connected to the battery 48 through a brake relay 62 which is a common brake releasing unit. The brake relay 62 is commonly connected to the left and right electromagnetic brakes 32 and 36, and is controlled to be switched ON and OFF by a control signal which is output from the ECU 50. Specifically, when the main switch 58 which is the power supply switch of the lawnmower vehicle 10 is switched OFF or when the brake pedal 52 is operated, that is, switched ON, the control signal which is output from the ECU 50 and obtained at the brake relay 62 becomes 0. In this case, the brake relay 62 is switched OFF, the supply of electricity from the battery 48 to the left and right electromagnetic brakes 32 and 36 is stopped, and the wheels 18 and 20 (FIG. 1) are braked. When the brake pedal 52 is switched ON, a signal indicating that the brake is switched ON is output from a brake sensor 64 provided at a periphery section of the brake pedal 52 to the ECU 50, and when the brake pedal 52 is switched OFF, a signal indicating that the brake is switched OFF is output from the brake sensor 64 to the ECU 50. When the brake pedal 52 is switched off, the signal indicating that the brake is switched off may not be output from the brake sensor 64 to the ECU 50.

On the other hand, when the main switch 58 is switched ON and a predetermined specific condition which is set in advance and which includes a condition that the brake pedal 52 is not being operated, that is, that the brake pedal 52 is not stepped on, is satisfied, a brake releasing instruction signal CR0 is output from the ECU 50 as a control signal, the brake relay 62 receiving the brake releasing instruction signal CR0 is switched ON, electricity is supplied from the battery 48 to the left and right electromagnetic brakes 32 and 36, and the braking of the wheels 18 and 20 (FIG. 1) is released.

Figure 6:
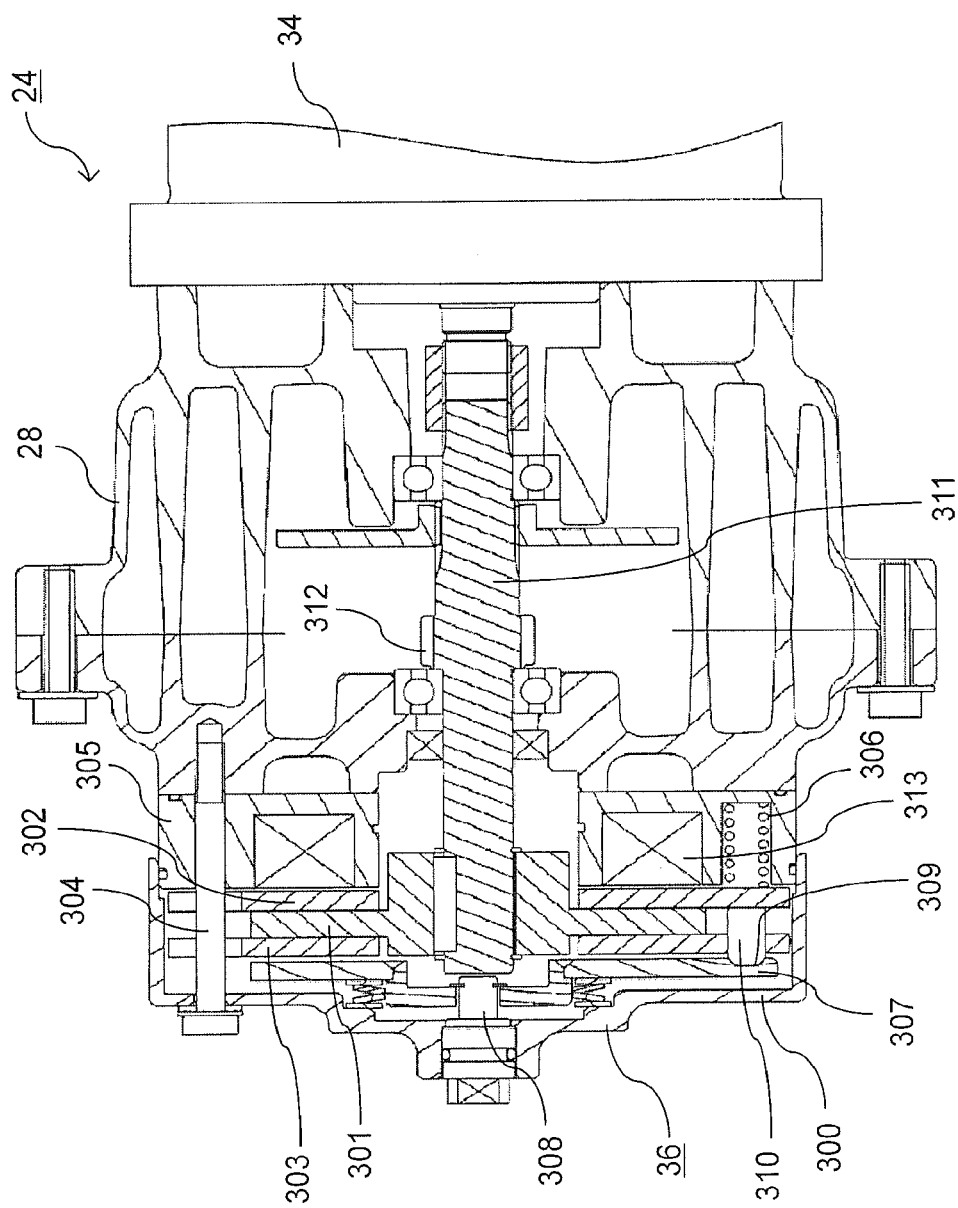
FIG. 6 is a cross sectional diagram along A-A line of a power generation unit of FIG. 1.

A detailed structure of the electromagnetic brakes 32 and 36 will now be described with reference to FIG. 6. FIG. 6 is an A-A cross sectional diagram of the power generation unit 24 of FIG. 1. FIG. 6 shows the power generation unit 24 on the right side, but the structure is similar with regard to the power generation unit 22 on the left side except that the left and right are reversed with respect to the power generation unit 24 on the right side. In a cover 300 of the electromagnetic brake 36, a friction plate 301 which is a rotational member which rotates in a linked manner with the corresponding wheels 18 and 20 (FIG. 1), steel plats 302 and 303 placed on both sides of the friction plate 301 and with the friction plate 301 therebetween, and a coil 313 are provided. The steel plates 302 and 303 are supported on a brake casing 305 through an engagement pin 304 in a slidable manner along the axial direction and a non-rotationable manner. The coil 313 opposes one steel plate 302 of the pair of steel plates 302 and 303, and can attract the plate 302 when electricity is supplied.

In addition, a spring 306 is provided in the brake casing 305 such that the plate 302 cooperates with the other steel plate 303 of the pair of steel plates 302 and 303 to sandwich and press the friction plate 301 when no electricity is supplied to the coil 313. Reference numeral 307 represents a stopping plate which limits the movement of the other steel plate 303 in the axial direction. The friction plate 301 forming the left and right electromagnetic brakes 32 and 36 (refer to FIG. 1 for reference numeral 32) is connected to and fixed at a position near an outer end of the casing of the rotational shaft 311 that is connected, for example, to the motor shaft of the traction motors 30 and 34 (refer to FIG. 1 for reference numeral 30) through a coupling joint. At a center position of the rotational shaft 311, a small gear 312 forming the motive power transmission mechanism described above is engraved.

In the electromagnetic brakes 32 and 36, the coil 313 generates an electromagnetic force with supply of electricity from the battery 48, to attract the one steel plate 302 against the urging force of the spring 306. When the supply of electricity from the battery 48 (FIG. 2) to the coil 313 is cut off in the electromagnetic brakes 32 and 36 by the switching ON of the brake pedal 52 (FIG. 2) or switching OFF of the main switch 58 (FIG. 2), the one steel plate 302 is pressed toward the friction plate 301 by the urging force of the spring 306, to execute a pressing operation for braking the corresponding one of the wheels 18 and 20, and the friction plate 301 is held between the steel plates 302 and 303. In this case, the corresponding one of the wheels 18 and 20 is braked.

On the other hand, when the electricity is supplied from the battery 48 to the coil 313 in each of the electromagnetic brakes 32 and 36, a pressing release operation for releasing the braking of the corresponding one of the wheels 18 and 20 is executed in which the one steel plate 302 is separated from the friction plate 301 against the urging force of the spring 306. In this case, the braking of the corresponding one of the wheels 18 and 20 is released, and traveling by the driving of the traction motors 30 and 34 is enabled.

The stopping plate 307 described above spline-fits an inner end side of a brake releasing shaft 308 rotatably held on the cover 300 at its center. The stopping plate 307 has a cam groove 309 which has different depths in the circumferential direction on a surface opposing the other steel plate 303. The other steel plate 303 guides and holds a pin 310 in a slidable manner in the axial direction at a position opposing the cam groove 309. One end of the pin 310 is inserted into a deep portion of the cam groove 309, and the other end of the pin 310 contacts the one steel plate 302. The outer end side of the brake releasing shaft 308 is protruded to the outside from the cover 300, and, with an artificial rotational operation using a predetermined tool, one end of the pin 310 is moved over a shallow portion of the cam groove 309 and the other end of the pin 310 pushes back the one steel plate 302 against the urging force of the spring 306, so that the pressing of the friction plate 301 is forcefully released even when the supply of electricity to the traction motors 30 and 34 (refer to FIG. 1 for reference numeral 30) and the coil 313 becomes not possible and the wheels 18 and 20 (FIG. 1) can be rotated freely for towing. The electromagnetic brake is not limited to such a structure, and various structures may be employed which execute the brake releasing operation of the left and right wheels 18 and 20 when electricity is supplied from the power supply and which executes the brake operation of the left and right wheels 18 and 20 when the supply of electricity from the power supply is cut off.

Figure 3:
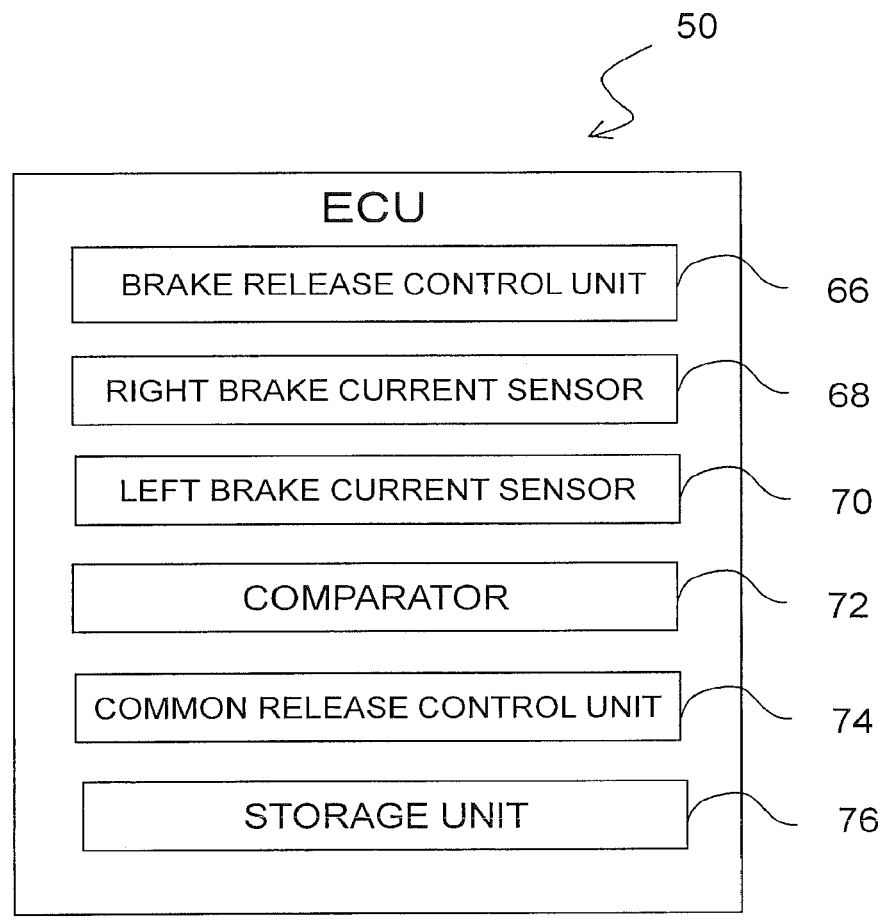
FIG. 3 is a diagram showing a structure of an ECU which is a controller in the lawnmower vehicle of FIG. 1.
Figure 4:
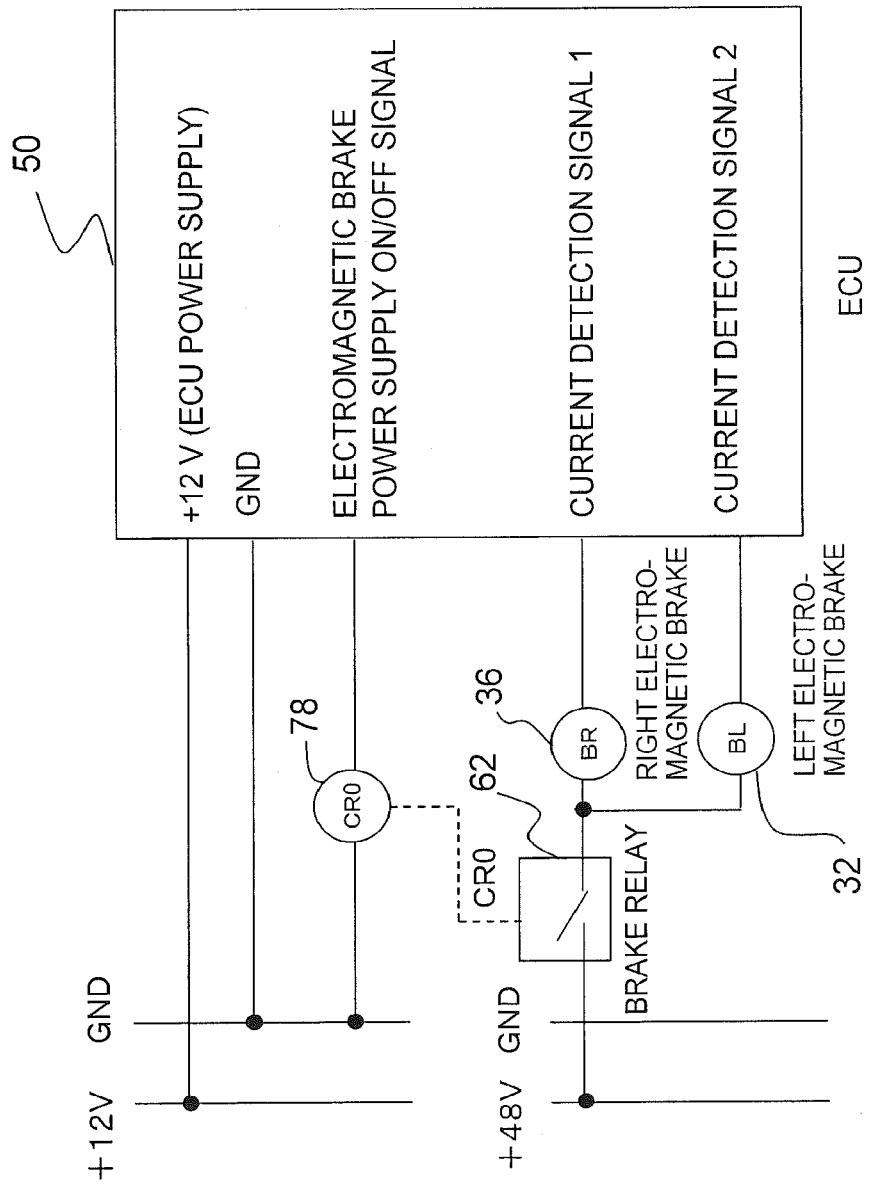
FIG. 4 is a diagram showing in detail a structure which controls supply of electricity of left and right electromagnetic brakes using a controller in the circuit structure of FIG. 2.

As shown in FIG. 3, the ECU 50 comprises a brake release control unit 66, a right brake current sensor 68, a left brake current sensor 70, a comparator 72, a common release control unit 74, and a storage unit 76. The brake release control unit 66 generates a brake releasing instruction signal for instructing the releasing of the brake according to a signal indicating that the main switch 58 (FIG. 2) is switched ON and which is input to the ECU 50, signals which are input from a sensor, a switch, or the like such as the brake sensor 64 (FIG. 2), etc. In the following description, elements that are identical to the elements shown in FIGS. 1, 2, and 6 are assigned the same reference numerals. The brake releasing instruction signal generated by the ECU 50 is output from the ECU 50 to the brake relay 62. Because of this, the brake relay 62 is switched ON, electric power is supplied from the battery 48 to the left and right electromagnetic brakes 32 and 36, and the braking of the left and right electromagnetic brakes 32 and 36 is released. As shown in FIG. 4, the brake releasing instruction signal generated by the ECU 50 may also be output to the brake relay 62 through an instruction signal output unit 78 provided separately from the ECU 50.

Referring back to FIG. 3, the left and right brake current sensors 68 and 70 are provided corresponding to the left and right electromagnetic brakes 32 and 36, and an amount of supply of electricity to the right electromagnetic brake 36 is detected by the right brake current sensor 68 as a current detection signal 1 (FIG. 4). Similarly, the amount of supply of electricity to the left electromagnetic brake 32 is detected by the left brake current sensor 70 as a current detection signal 2 (FIG. 4). Because of this, as shown in FIG. 4, the left and right electromagnetic brakes 32 and 36 are connected to the ECU 50. Alternatively, the left and right brake current sensors may be provided at a portion separate from the ECU 50 and the detected signals of the left and right brake current sensors may be output to the ECU 50.

The comparator 72 shown in FIG. 3 compares the current detection signals 1 and 2 which represent the electricity supply states of the left and right electromagnetic brakes 32 and 36 and which are detected signals for the left and right electromagnetic brakes 32 and 36.

The common release control unit 74 stops output of the brake releasing instruction signal CR0 to the brake relay 62 when the controller judges that a difference between the current detection signals 1 and 2 of the left and right brake current sensors 70 and 68, which is a difference in the electricity supply states compared by the comparator 72, exceeds an allowable upper limit, to control the brake relay 62 to disconnect the electrical connection between the battery 48 and the left and right electromagnetic brakes 32 and 36 and to brake the left and right wheels 18 and 20 by the spring 306. For example, the "allowable upper limit" described above may be set to 0. That is, a configuration may be employed in which, when the controller judges that the difference between the current detection signals 1 and 2 is greater than 0, the common release control unit 74 controls the brake relay 62 to disconnect the electrical connection between the battery 48 and the left and right electromagnetic brakes 32 and 36 and to brake the left and right wheels 18 and 20.

For example, when there is an abnormality such as line disconnection in a circuit connecting the right electromagnetic brake 36, which is one electromagnetic brake of the left and right electromagnetic brakes 32 and 36, and the battery 48, even when the brake releasing instruction signal CR0 is output to the brake relay 62, the right electromagnetic brake 36 is not supplied with electricity, and the current detection signal 1 is 0. If the circuit connecting the left electromagnetic brake 32, which is the other electromagnetic brake of the left and right electromagnetic brakes, and the battery 48 is normal, a difference is created between the current detection signals 1 and 2. Because of this, if the structure of the common release control unit 74 described above is not provided, only the right electromagnetic brake 36 in which abnormality has occurred during travel is operated, and the right wheel 20 is braked. Thus, the vehicle turns to the right, and is moved in a direction unintended by the driver. According to the present embodiment, on the other hand, because the common release control unit 74 described above is provided, if a difference is created between the current detection signals 1 and 2 during travel, the common release control unit 74 controls the brake relay 62 to switch the brake relay 62 OFF, to brake both the left and right wheels 18 and 20, and thus, the vehicle does not turn and stops. When the abnormality and normality of the left and right electromagnetic brakes 32 and 36 are opposite, similar operation is executed except that the left and the right structures are reversed. In the present embodiment, the DC-to-DC converter 60 is provided so that a single common battery 48 is used for the battery for the ECU 50 and the battery for the left and right electromagnetic brakes 32 and 36, but alternatively, separate batteries having different output voltages may be employed for the battery for the ECU 50 and the battery for the left and right electromagnetic brakes 32 and 36.

Figure 5:
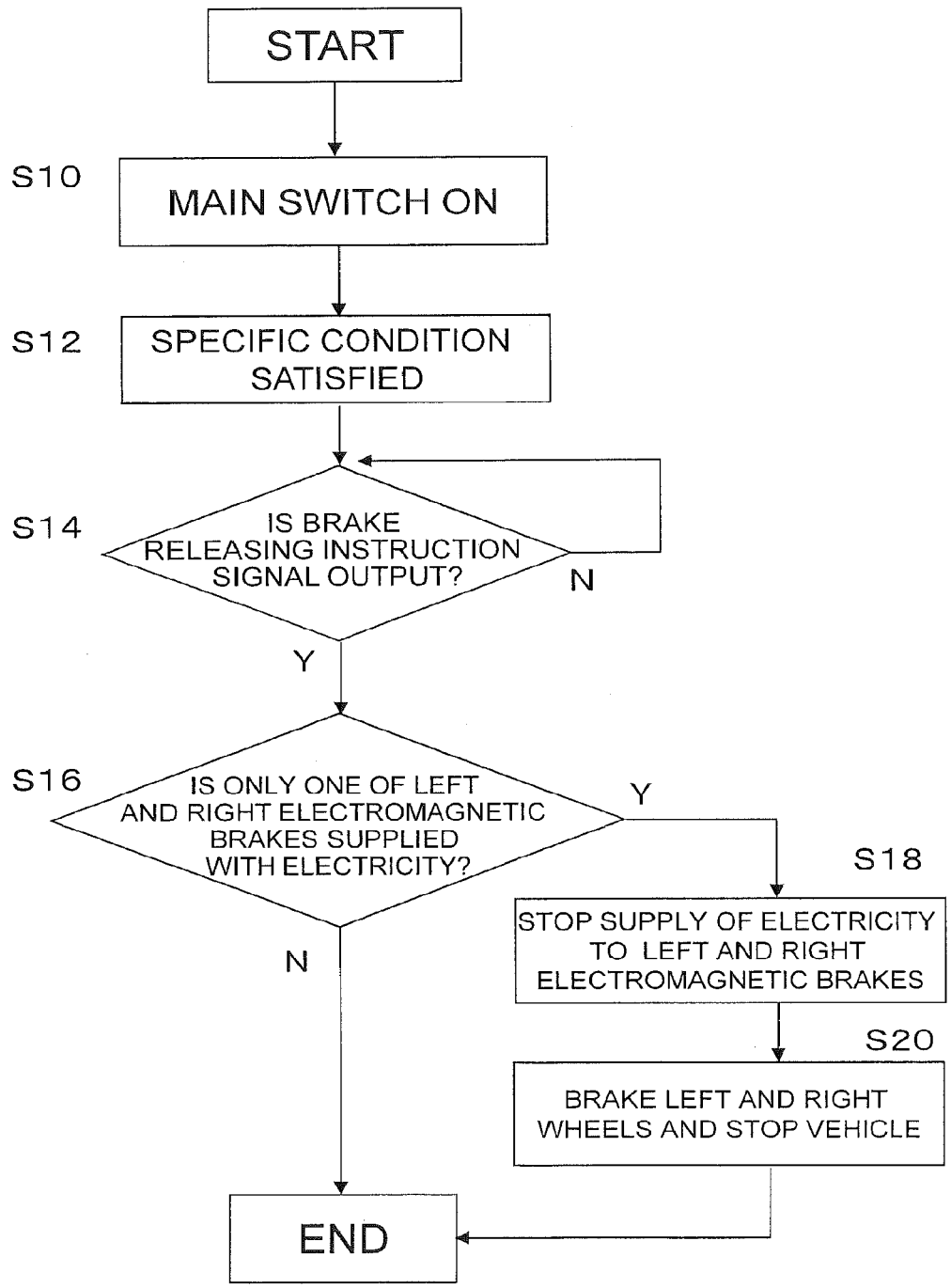
FIG. 5 is a flowchart for explaining a method of controlling supply of electricity of left and right electromagnetic brakes in the lawnmower vehicle of FIG. 1.

FIG. 5 is a flowchart for explaining a method of controlling supply of electricity of the left and right electromagnetic brakes 32 and 36 in the lawnmower vehicle of the present embodiment. In steps (hereinafter simply referred to using "S") S10 and S12, the main switch 58 is switched ON and the ECU 50 judges that the specific condition which is set in advance and which includes a condition that the brake pedal 52 is not being operated is satisfied. In S14, it is judged whether or not the brake releasing instruction signal CR0 is output to the brake relay 62. When it is judged that the brake releasing instruction signal CR0 is output, in S16, the comparator 72 compares the current detection signals 1 and 2 of the brake current sensors 68 and 70, and it is judged whether or not only one of the left and right electromagnetic brakes 32 and 36 is supplied with electricity by judging whether or not the difference between the current detection signals 1 and 2 exceeds the allowable upper limit. When it is judged that only one of the left and right electromagnetic brakes 32 and 36 is supplied with electricity, the common release control unit 74 switches the brake relay 62 OFF in S18, releases the supply of electricity from the battery 48 to the left and right electromagnetic brakes 32 and 36, brakes both the left and right wheels 18 and 20, and causes the vehicle to stop (S20).

When, on the other hand, it is not judged in S16 that only one of the left and right electromagnetic brakes 32 and 36 is supplied with electricity, that is, when it is judged that both electromagnetic brakes 32 and 36 are supplied with electricity, the common release control unit 74 maintains the brake relay 62 in the ON state, maintains the supply of electricity from the battery 48 to the left and right electromagnetic brakes 32 and 36, and maintains the released state of the braking of both of the left and right wheels 18 and 20.

According to the present embodiment having such a configuration, when abnormality occurs in one electromagnetic brake 32 (or 36) among the left and right electromagnetic brakes 32 and 36, a difference is created in the electricity supply states of the left and right electromagnetic brakes 32 and 36, and when the difference exceeds the allowable upper limit, the common release control unit 74 controls the brake relay 62 to disconnect the electrical connection between the battery 48 and the left and right electromagnetic brakes 32 and 36 and to brake the left and right wheels 18 and 20. Because of this, even when abnormality occurs in one electromagnetic brake 32 (or 36), a turn which is not intended by the driver can be effectively prevented. The above-described function and structure of the ECU 50 may be realized with a program or with hardware. For example, in the present embodiment, the controller which controls the brake relay 62 is not limited to the ECU 50 having the CPU and the storage unit, and, for example, may alternatively be formed by a circuit structure which switches the brake relay 62ON when the current detection signals 1 and 2 are not 0 and there is no difference between the current detection signals 1 and 2, and switches the brake relay 62 OFF when there is a difference between the current detection signals 1 and 2.

[Second Embodiment]

Figure 7:
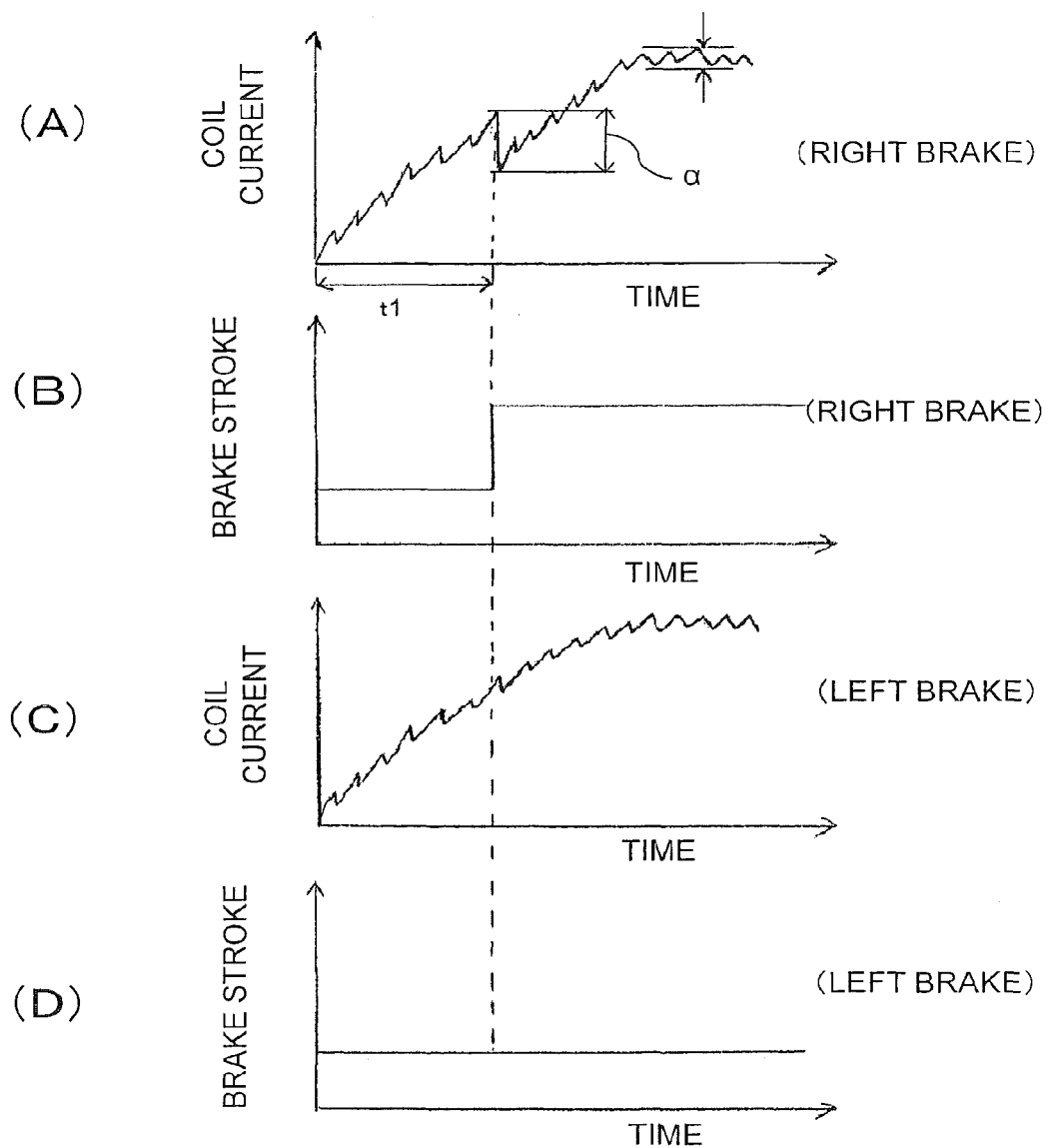
Figure 8:
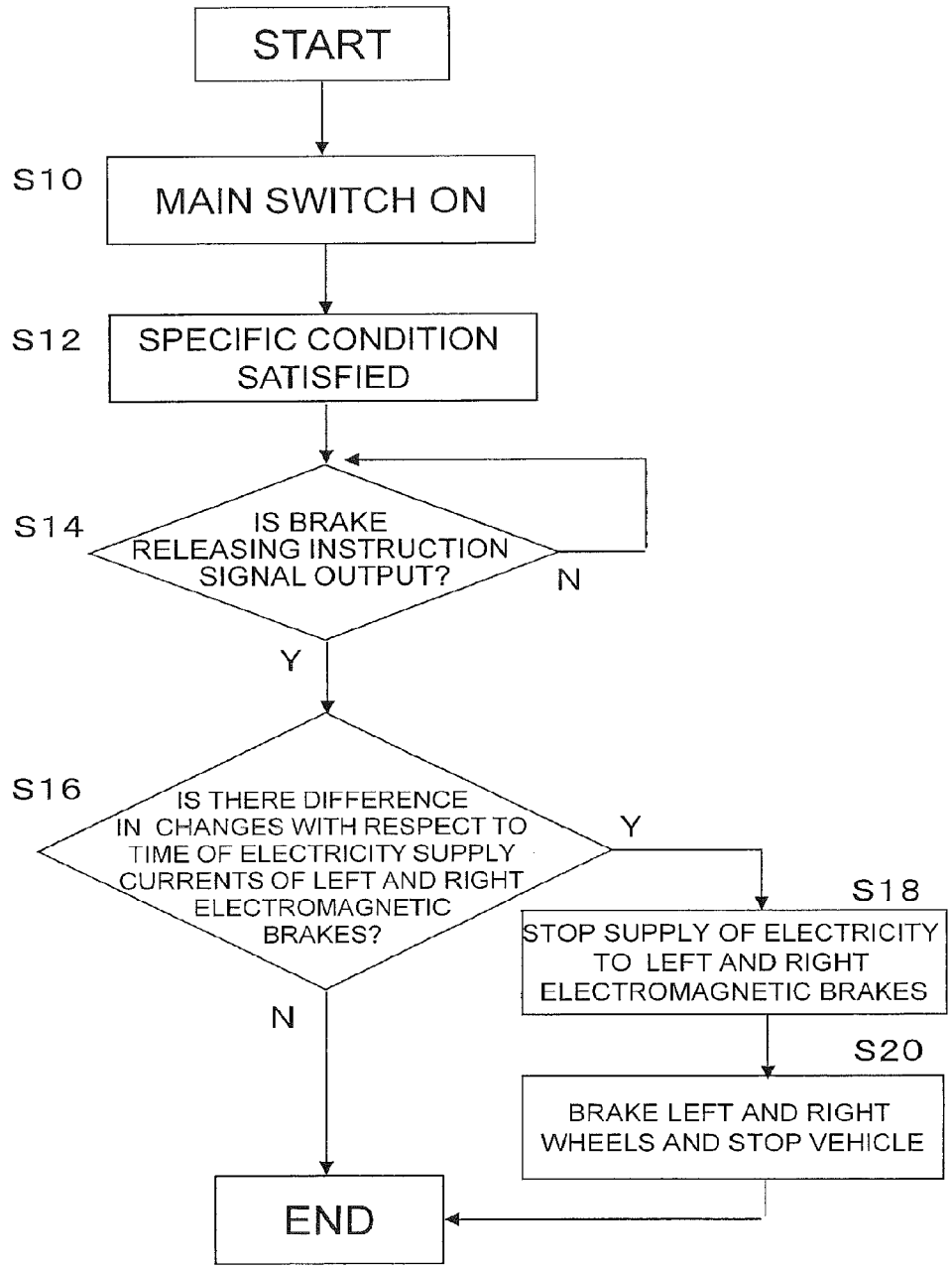
FIG. 8 is a flowchart for explaining a method of controlling supply of electricity to the left and right electromagnetic brakes in the second embodiment of the present invention.

FIGS. 7 and 8 show a second embodiment of the present invention. In a lawnmower vehicle of the present embodiment, the structures other than a part of the ECU 50 (FIG. 3) are similar to those of the first embodiment described above. Therefore, the elements similar to or corresponding to the elements of FIGS. 1-4 and 6 are assigned the same reference numerals and will be described with reference to FIGS. 1-4 and 6.

In the present embodiment, the storage unit 76 of the ECU 50 stores changes with respect to time of coil currents which are left and right brake electricity supply currents and which represent the electricity supply states to the left and right electromagnetic brakes 32 and 36. FIGS. 7(A)-7(D) are diagrams showing the present embodiment. More specifically, FIG. 7(A) is a diagram showing an example change with respect to time of the coil current which is a current flowing in a coil 31 of the right electromagnetic brake 36 during a normal state, FIG. 7(B) is a diagram showing an example change with respect to time of an amount of stroke, that is, an amount of displacement, of one steel plate 302 in a direction away from the friction plate 301, which is a brake stroke of the right electromagnetic brake 36 during a normal state, FIG. 7(C) is a diagram showing an example change with respect to time of a coil current of the left electromagnetic brake 32 during occurrence of abnormality, and FIG. 7(D) is a diagram showing an example change with respect to time of a brake stroke of the left electromagnetic brake 32 during occurrence of abnormality.

A case is considered in which the brake releasing instruction signal CR0 is output to the brake relay 62 in the braked state of the vehicle so that electricity is supplied from the battery 48 to the left and right electromagnetic brakes 32 and 36, as shown in FIGS. 7(A)-7(D). In this case, as shown in FIGS. 7(A) and 7(C), due to the supply of electricity to the electromagnetic brakes 32 and 36, the coil current gradually increases with time while fluctuating up and down because of the inductance, impedance, or the like of the coil 313, and with the increase in the coil current, the attraction force by the coil 313 on the one steel plate 302 is increased. In this case, as shown in FIG. 7(B), even in the normal right electromagnetic brake 36, the one steel plate 302 is not separated from the friction plate 301 so long as the force of attraction on the one steel plate 302 by the coil 313 does not exceed the urging force of the spring 306, and the brake stroke stays constant. When time t1 has elapsed and the force of attraction on the one steel plate 302 by the coil 313 exceeds the urging force of the spring 306, the brake stroke changes, the one steel plate 302 is separated from the friction plate 301, and braking is released. In this case, because the one steel plate 302 rapidly approaches the coil 313, a large current disturbance α is caused in the coil current.

On the other hand, as shown in FIG. 7(C), there is a possibility that an abnormality may occur in the left electromagnetic brake 32 and the one steel plate 302 will continue to be pressed toward the friction plate 301 for some reason even when the current flows in the coil 313. In this case, even if the coil current gradually increases in the initial state similar to the case of the right electromagnetic brake 36, the large current disturbance of the coil current does not occur when the time t1 has elapsed. As shown in FIG. 7(D), the brake stroke is maintained at a constant both before and after the time t1 has elapsed. Because of this, as is clear from comparison of FIGS. 7(A) and 7(C), when an abnormality occurs in one electromagnetic brake 32 (or 36) among the left and right electromagnetic brakes 32 and 36, a difference is created between the changes with respect to time of the coil current for the left and right electromagnetic brakes 32 and 36.

In the present embodiment, for this reason, the changes with respect to time of the coil currents of the left and right electromagnetic brakes 32 and 36 are stored in the storage unit 76, and are compared in the comparator 72. For example, the coil currents of the left and right electromagnetic brakes 32 and 36 may be detected by the left and right brake current sensors 70 and 68 only when the electromagnetic brakes 32 and 36 are transitioned from the brake operation state to the brake releasing operation, the changes with respect to time of the coil currents may be stored, and the changes with respect to time of the coil currents may be compared by the comparator 72. When the common release control unit 74 judges that a difference in the changes with respect to time of the electricity supply currents of the left and right electromagnetic brakes 32 and 36 which represent the electricity supply states compared by the comparator 72 exceeds an allowable upper limit, for example, when the common release control unit 74 judges that there is a difference in the changes with respect to time of the coil currents of the left and right electromagnetic brakes 32 and 36, the common release control unit 74 controls the brake relay 62 to disconnect the electrical connection between the battery 48 and the left and right electromagnetic brakes 32 and 36 and to brake the left and right wheels 18 and 20.

FIG. 8 is a flowchart for explaining a method of controlling supply of electricity to the left and right electromagnetic brakes 32 and 36 in the present embodiment. In the flowchart of FIG. 8, the steps other than S16 are similar to those of the flowchart of the first embodiment shown in FIG. 5. As shown in FIG. 8, when it is judged in S14 that the brake releasing instruction signal CR0 is output to the brake relay 62, in S16, the comparator 72 compares the changes with respect to time of the coil currents which are the electricity supply currents to the left and right electromagnetic brakes 32 and 36, and when it is judged that the changes with respect to time of the coil currents differ from each other by a difference exceeding the allowable upper limit, the process transitions to S18. In S18, the common release control unit 74 switches the brake relay 62 OFF, to release the supply of electricity from the battery 48 to the left and right electromagnetic brakes 32 and 36, to brake both left and right wheels 18 and 20, and to stop the vehicle (S20).

In the present embodiment having such a configuration also, similar to the first embodiment described above, even if an abnormality occurs in one electromagnetic brake 32 (or 36) among the left and right electromagnetic brakes 32 and 36, the turning unintended by the driver can be effectively prevented. Other structures and operations are similar to those of the first embodiment described above, and will not be described again.

Alternatively, in the present embodiment, a configuration may be employed in which amounts of wear of the steel plates 302 and 303 or the friction plates of the electromagnetic brakes 32 and 36 are detected, the changes with respect to time of the coil currents are corrected based on differences in the detected values of the amounts of wear, and the changes with respect to time of the coil currents after the correction are compared in the comparator 72. In this case, a more effective structure can be realized in which the left and right wheels 18 and 20 can be braked only during the occurrence of abnormality, even when the amounts of wear of the steel plates 302 and 303 or the friction plates 301 differ between the left and right electromagnetic brakes 32 and 36.

In the present embodiment, an example configuration is described in which the changes with respect to time of the coil currents of the left and right electromagnetic brakes 32 and 36 are compared, but alternatively, a configuration may be employed in which, for example, a maximum value and a maximum current change width α for the change of the coil current per unit time (that is, the rate of change with respect to time of the coil current) in the changes with respect to time of the coil currents when transitioning from the brake state to the brake releasing state are stored in the storage unit 76 as the electricity supply states of the left and right electromagnetic brakes 32 and 36. In this case, the comparator compares the maximum values and the maximum current change widths α of the coil currents per unit time between the left and right electromagnetic brakes 32 and 36, and when one or both of the maximum change and the maximum current change width α of the coil current exceeds an allowable upper limit, the common release control unit 74 may switch the brake relay 62 OFF and brake the left and right wheels 18 and 20. Alternatively, the control of the present embodiment may be executed in combination with the control of the first embodiment.

Although not shown in the drawings, as a third embodiment of the present invention, separate brake current sensors corresponding to the left and right brake current sensors may be provided as a backup for the left and right brake current sensors. For example, in the first embodiment described above with reference to FIGS. 1-6, left and right second brake current sensors may be provided for the left and right electromagnetic brakes 32 and 36 at different parts from the parts where the left and right brake current sensors 70 and 68 are provided, and connected in the ECU 50 or out of the ECU 50. During the normal time, backup switches, such as relays, in an OFF state are connected between the left and right second brake current sensors and the left and right electromagnetic brakes 32 and 36. When abnormality occurs in one of the brake current sensors 68 and 70, the corresponding backup switch is switched ON, and the detected signal of the second brake current sensor is used for comparison at the comparator 72. In addition, the ECU 50 switches the backup switch ON when a current detection specific condition which is set in advance is satisfied, to detect the electricity supply currents by the brake current sensors 68 and 70 and the second brake current sensors, and the detected currents of the right brake current sensor 68 and the right second brake current sensors are compared and the left brake current sensor 70 and the left second brake current sensors are compared. When it is judged that a difference in detected current between the brake current sensor 68 or 70 and the second brake current sensors exceeds an allowable upper limit on the right or the left, it is judged that an abnormality has occurred in one or some of the brake current sensors, and the common release control unit 74 controls the brake relay 62 to switch the brake relay 62 OFF regardless of the difference in the detected currents of the brake current sensors 68 and 70 and the difference in the detected currents of the second brake current sensors.

According to the third embodiment having such a structure also, the turning unintended by the driver can be effectively prevented even when abnormality has occurred in one of the electromagnetic brakes 32 and 36 among the left and right electromagnetic brakes 32 and 36, and moreover, the vehicle can be braked without forceful traveling of the vehicle when abnormality occurs in any of the current sensors.

In the above-described embodiments, an exemplary configuration has been described in which the vehicle is turned by a difference in rotational velocities of the wheels 18 and 20 which are the drive wheels, but the present invention is not limited to this configuration. Alternatively, for example, a configuration may be employed in which left and right steering wheels which are operatively connected to the steering operator by a rack-and-pinion mechanism or the like are provided in place of the left and right caster wheels, and the orientations of the left and right steering wheels are changed according to steering of the steering operator.

As described above, according to one aspect of the present invention, the working vehicle with an electromagnetic brake comprise a left wheel and a right wheel which are drive wheels driven for travel by a left traction motor and a right traction motor, respectively, a working machine which is driven for executing ground work, a left electromagnetic brake and a right electromagnetic brake provided corresponding to the left wheel and the right wheel, respectively, and which execute a brake release operation of the left wheel and the right wheel by supply of electricity from a power supply and execute a brake operation of the left wheel and the right wheel when the supply of electricity from the power supply is cut off, a common brake releasing unit which is common to the left electromagnetic brake and the right electromagnetic brake and which electrically connects the power supply and the left electromagnetic brake and the right electromagnetic brake to supply electricity from the power supply to the left electromagnetic brake and the right electromagnetic brake when a brake releasing instruction is obtained, and a controller which controls the common brake releasing unit, wherein the controller compares electricity supply states of the left electromagnetic brake and the right electromagnetic brake, and controls the common brake releasing unit to disconnect an electrical connection between the power supply and the left electromagnetic brake and the right electromagnetic brake and to brake the left wheel and the right wheel when a difference between the compared electricity supply states exceeds an allowable upper limit.

With the working vehicle with an electromagnetic brake as described above, because a difference is caused between the electricity supply states of the left and right electromagnetic brakes when abnormality occurs in one of the electromagnetic brakes among the left and right electromagnetic brakes, the controller controls the common brake releasing unit to disconnect the electrical connection between the power supply and the left and right electromagnetic brakes and to brake the left and right wheels when the difference exceeds the allowable upper limit. Because of this, the turning unintended by the driver can be effectively prevented even during occurrence of abnormality in one of the electromagnetic brakes.

According to another aspect of the present invention, preferably, in the working vehicle with an electromagnetic vehicle, each of the left electromagnetic brake and the right electromagnetic brake comprises a rotational member which rotates in a linked manner with a corresponding one of the wheels, a pressurizing member which can be pressed against the rotational member, an urging unit which applies an urging force on the pressurizing member in a direction toward the rotational member, and a coil which separates the pressurizing member from the rotational member against the urging force by supply of electricity from the power supply, and each of the left electromagnetic brake and the right electromagnetic brake executes a pressurizing operation for braking by a corresponding one of the pressuring members being pressed against a corresponding one of the rotational members by cutting of supply of electricity from the power supply, and executes a press releasing operation for releasing the brake by the pressurizing member being separated from the rotational member by supply of electricity from the power supply.

[Fourth Embodiment]

Figure 9:
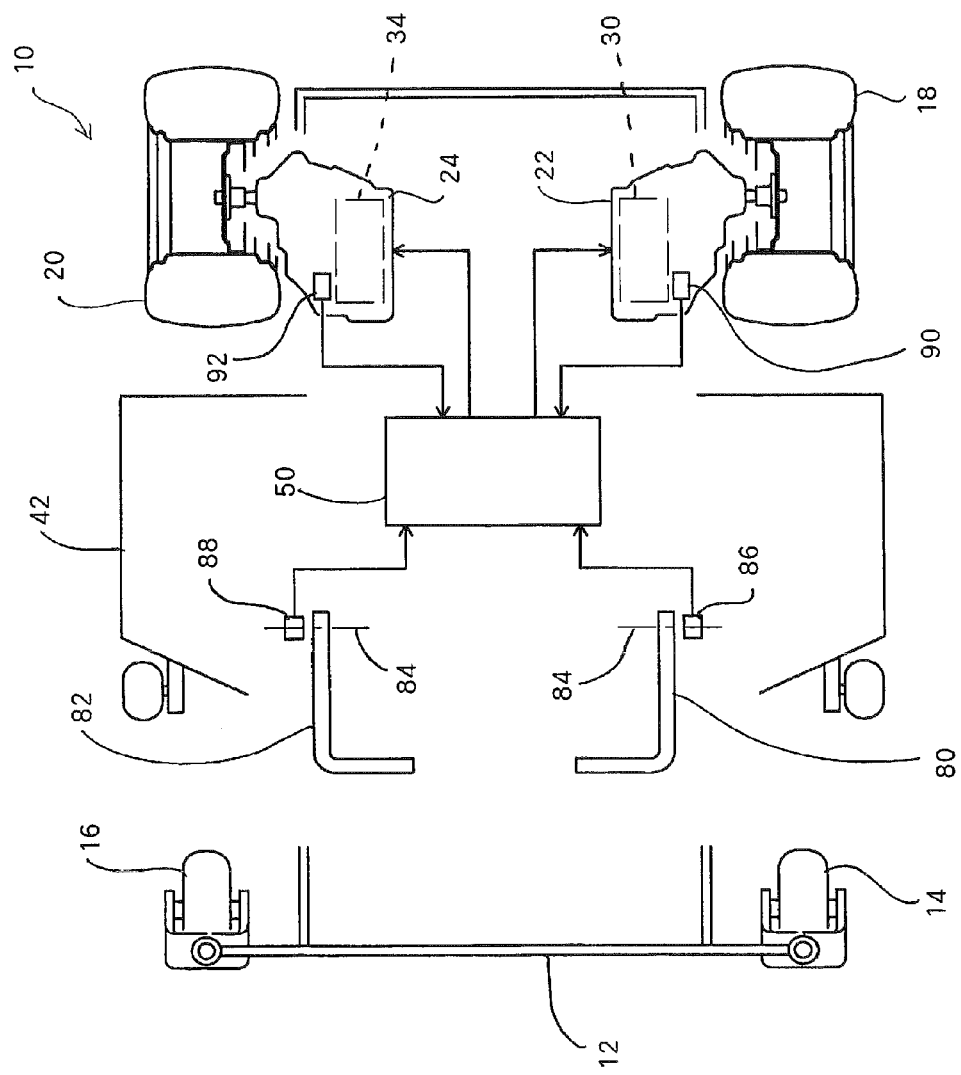
FIG. 9 is a schematic diagram showing, from above, a structure of a lawnmower vehicle which is a working vehicle with an electromagnetic brake according to a fourth embodiment of the present invention.
Figure 10:
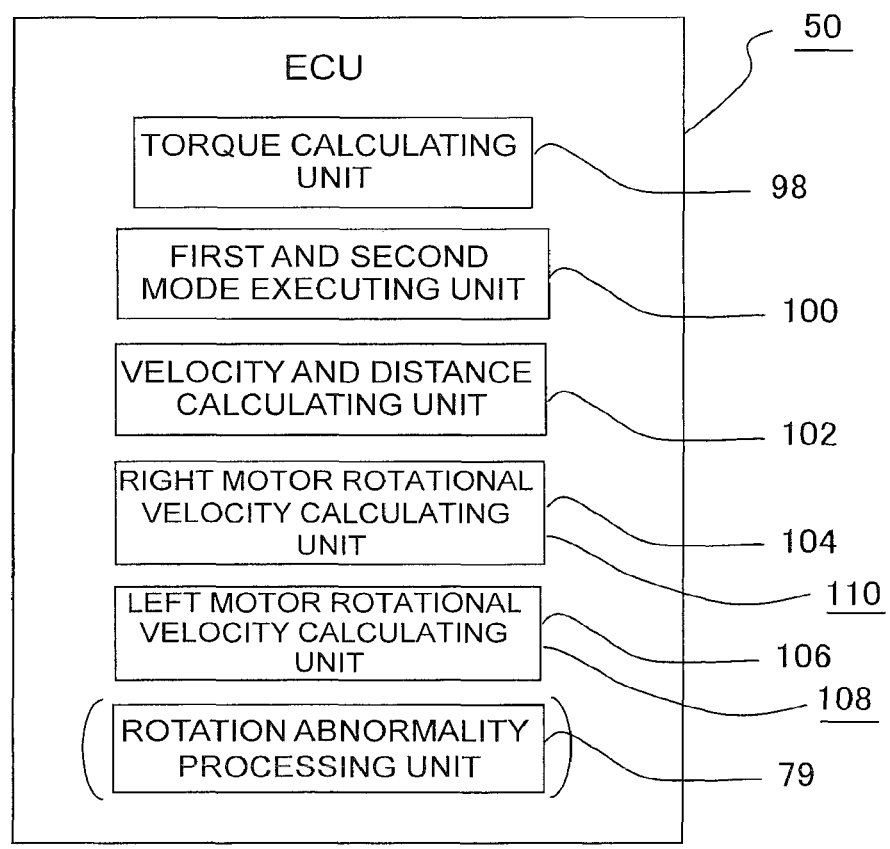
FIG. 10 is a diagram showing a structure of an ECU which is a controller in the fourth embodiment of the present invention.
Figure 11:
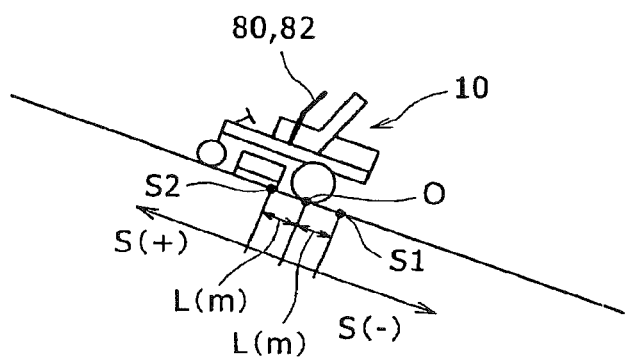
FIG. 11 is a schematic diagram showing stopping of a vehicle on an inclined road in the fourth embodiment of the present invention.
Figure 12A:
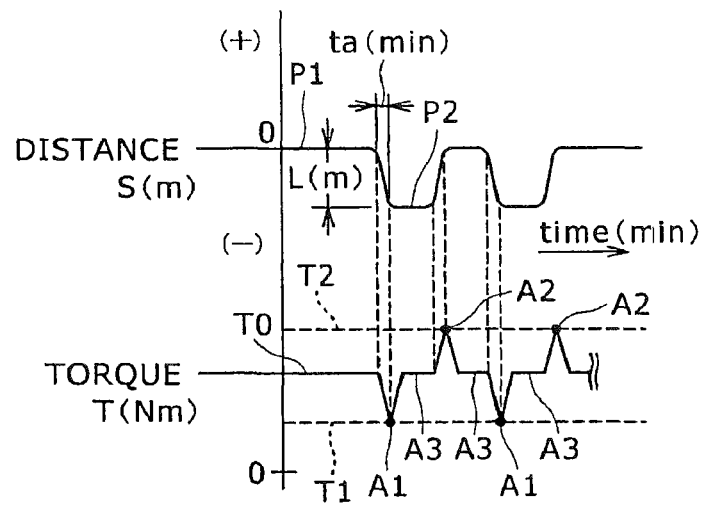
FIG. 12A is a diagram showing an example change with respect to time of a movement distance and a torque instruction of an electric motor when the vehicle of FIG. 11 is controlled by a first and second mode executing unit.

FIGS. 9-11 and 12A show a fourth embodiment of the present invention. FIG. 9 is a schematic diagram showing, from above, a structure of a lawnmower vehicle which is a working vehicle with electromagnetic brake according to the present embodiment. FIG. 10 is a diagram showing a structure of an ECU which is a controller in the present embodiment. FIG. 11 is a schematic diagram showing stopping of a vehicle on an inclined road in the present embodiment. FIG. 12A is a diagram showing an example change with respect to time of a movement distance and a torque instruction of an electric motor when the vehicle of FIG. 11 is controlled by a first and second mode executing unit. FIG. 10 also shows a rotation abnormality processing unit 79 which is a structure used in an alternative configuration of the fourth embodiment to be described later.

As shown in FIG. 9, the lawnmower vehicle 10 comprises left and right levers 80 and 82 which are acceleration operators provided on the left and right sides of a seat (not shown) on which the driver sits. The left and right levers 80 and 82 can move swingably about a shaft 84 oriented toward the width direction of the vehicle, and have a function to instruct a target velocity of the vehicle by an operation of the driver. The left and right levers 80 and 82 also have a function as a turn operator. The left and right levers 80 and 82 are also a brake maintaining instruction provider. The functions of the left and right levers 80 and 82 are similar to those described above with reference to the first embodiment.

The left and right wheels 18 and 20 which are rear wheels are independently driven for travel by the left and right power generation units 22 and 24 supported on the main frame 12. The power generation units 22 and 24 have structures similar to the structures described above with reference to FIG. 1. For example, although FIG. 9 does not show the power generation units 22 and 24 in detail, similar to the structure of FIG. 1, brake casings for the electromagnetic brakes 32 and 36 (FIG. 1) and motor casings for the traction motors 30 and 34, which are electric motors, are fixed on the casings 26 and 28 of the power generation units 22 and 24. In other words, the electromagnetic brakes 32 and 36 and the traction motors 30 and 34 are integrally provided in the power generation units 22 and 24. Alternatively, the electromagnetic brakes may be placed in a single common casing, and the single casing may be supported on the main frame 12.

A left side of FIG. 9 represents the front side of the vehicle, and a right side of FIG. 9 represents the rear side. The traction motors 30 and 34 are synchronous electric motors of a plurality of phases, for example, 3 phases, inductive electric motors, etc. to which electric power is supplied from the battery 48 (FIG. 2) through the driver circuit 54.

The lawnmower vehicle 10 is equipped with the ECU 50 which is a main controller. In addition, left and right lever sensors 86 and 88 which are operator sensors which detect an amount of operation and an operation direction of the left and right levers 80 and 82 are provided at the periphery section of the left and right levers 80 and 82. Detected values of the lever sensors 86 and 88 are input to the ECU 50. The ECU 50 controls the driving of the left and right traction motors 30 and 34 through left and right motor controllers (not shown) which are left and right drive wheel controllers according to the detected values of the lever sensors 86 and 88. The left and right traction motors 30 and 34 can be rotated in opposite directions from each other by operating the left and right levers 80 and 82 in opposite directions, and with pushing of the left and right levers 80 and 82 in opposite directions and by the same amount, it is possible to rotate the left and right traction motors 30 and 34 in opposite directions and with the same velocity. In this case, an on-the-spot turning which is called a zero-turn may be executed in which the vehicle turns with the central position in the width direction of the vehicle on the same straight line as the axle of the left and right wheels 18 and 20 as the center of the turn. Such a vehicle is called a ZTR type vehicle. The vehicle of the present embodiment is not limited to the ZTR type vehicle. For example, the present embodiment may be applied to a vehicle provided with the steering operator and the accelerator pedal, as described above with reference to FIG. 1.

In addition, left and right rotational angle sensors 90 and 92 which detect a rotational angle per predetermined time of the corresponding the traction motor 30 (or 34) are provided in the power generation units 22 and 124. Detected values of the rotational angle sensors 90 and 92 are input to the ECU 50. Moreover, left and right levers 80 and 82 are configured to be able to be moved swingably and displaced in an outer side in the width direction of the vehicle in a stop state where the left and right levers 80 and 82 stand straight and the target velocity of the vehicle is 0, that is, the neutral position. Neutral switches 94 and 96 (refer to FIG. 17) which are left and right lever switches which are switched ON when the levers 80 and 82 are pushed to the outside are provided. Signals indicating the switching ON of the neutral switches 94 and 96 are also input to the ECU 50. When the neutral switches 94 and 96 are switched ON during the time when the main switch 58 (FIG. 2) which is the power supply switch is in the ON state, the ECU 50 judges that maintaining the brake is instructed, switches the brake relay 62 (FIG. 2) OFF, and cuts the supply of electric power from the battery 48 (FIG. 2) to the left and right electromagnetic brakes 32 and 36. In other words, when the neutral switches 94 and 96 are switched ON, the ECU 50 instructs to cut the supply of electricity to the electromagnetic brakes 32 and 36 and to maintain the braking of the left and right wheels 18 and 20. In this case, the left and right electromagnetic brakes 32 and 36 are switched ON and the brake state of the wheels 18 and 20 is maintained. The neutral switches 94 and 96 are switched OFF when the left and right levers 80 and 82 returns from the pushed outward state to the straight standing state. Alternatively, in the present embodiment, the neutral switches 94 and 96 may be omitted. Furthermore, alternatively, a configuration may be employed in which a parking lever which can be reciprocated by pushing and pulling is provided on the lawnmower vehicle 10, the parking lever is pulled to switch the neutral switch ON, and a signal indicating the switching ON of the neutral switch is input to the ECU 50.

In addition, as shown in FIG. 10, the ECU 50 comprises a torque calculating unit 98, a first and second mode executing unit 100, a velocity and distance calculating unit 102, a right motor rotational velocity calculating unit 104, and a left motor rotational velocity calculating unit 106. The left and right motor rotational velocity calculating units 106 and 104 calculate the rotational velocities of the corresponding traction motors 30 and 34 based on the detected rotational angles of the left and right rotational angle sensors 90 and 92, respectively. The left rotational angle sensor 90 and the rotational velocity calculating unit 106 form a left motor velocity detecting unit 108 and the right rotational angle sensor 92 and the rotational velocity calculating unit 104 form a right motor velocity detecting unit 110. Alternatively, unlike the example configuration of the drawings, motor velocity detecting units which detect the rotational velocities of the left and right traction motors 30 and 34 may be provided at the periphery section of the left and right traction motors 30 and 34, and the detected values of the motor velocity detecting units may be input to the ECU 50.

The torque calculating unit 98 calculates a vehicle velocity 0 setting torque T0 which is a torque necessary for maintaining an actual velocity of the vehicle at 0 when the target velocity of the vehicle detected by the lever sensors 86 and 88 (FIG. 9) is 0 and which is a torque to be generated in the traction motors 30 and 34 (FIG. 9). For example, when the levers 80 and 82 are set in a standing straight state while the lawnmower vehicle 10 is positioned on an inclined road as shown in FIG. 11, and the target velocity is instructed to be 0, the torque calculating unit 98 calculates the vehicle velocity 0 setting torque T0 necessary to balance with the load acting in a direction to pull down the vehicle 10 by the force of gravity and to maintain the velocity of the vehicle 10 at 0. For example, in the state where the vehicle 10 is stopped as shown in FIG. 11, the vehicle velocity 0 setting torque T0 necessary for maintaining the rotational velocities of the traction motors 30 and 34 at 0 is calculated using the detected values of the motor velocity detecting units 108 and 110 (FIG. 10). In the following description, elements identical to the elements shown in FIGS. 9 and 10 will be assigned the same reference numerals and described.

The first and second mode executing unit 100 alternately executes, when the target velocity of the vehicle 10 detected by the lever sensors 86 and 88 is 0 and after the actual velocity of the vehicle 10 is set to 0, a first mode (a state of A1 in FIG. 12A) in which a first torque T1 (FIG. 12A) smaller than the vehicle velocity 0 setting torque T0 (FIG. 12A) is generated in the traction motors 30 and 34, and a second mode (a state of A2 in FIG. 12A) in which a second torque T2 (FIG. 12A) larger than the vehicle velocity 0 setting torque T0 is generated in the traction motors 30 and 34, to control the traction motors 30 and 34 such that movements between positions of 2 points separated in the front and rear direction of the vehicle 10 (positions of point O and point S1 in FIG. 11) are periodically repeated.

The velocity and distance calculating unit 102 has a function to calculate, at least during execution of the first and second modes, a movement velocity and a movement distance of the vehicle 10, respectively, based on the rotational velocities of the traction motors 30 and 34 detected by the motor velocity detecting units 108 and 110.

The ECU 50 sets, during the execution of the first and second mode executing unit 100, a movement velocity of the vehicle 10 when the vehicle 10 transitions from the state where the actual velocity is 0 (a state of P1 in FIG. 12A) to the execution of the first mode, and a movement velocity (L/ta (m/min)) of the vehicle 10 when the vehicle 10 transitions from a state where the actual velocity is 0 (a state of P2 in FIG. 12A) to the execution of the second mode, to a velocity less than or equal to a predetermined velocity (for example, less than or equal to 1 m/min) which is set in advance. In addition, the ECU 50 sets a movement distance L of the vehicle 10 when the vehicle 10 transitions from the state of P1 of FIG. 12A to the first mode, and a movement distance L of the vehicle 10 when the vehicle 10 transitions from the state of P2 of FIG. 12A to the second mode, to a distance less than or equal to a predetermined distance (for example, less than or equal to 1 m) which is set in advance. The first and second mode executing unit 100 sets a time interval between the first mode and the second mode to be a constant. Alternatively, as shown in FIG. 12A, the first and second mode executing unit 100 may execute a third mode (state of A3 in FIG. 12A), in which the vehicle velocity 0 setting torque T0 is continuously generated for a constant period which is set in advance in the traction motors 30 and 34 at a position (position of point O in FIG. 11) where the movement distance of the vehicle 10 is 0, between the first mode execution and the second mode execution. The continued execution time of each third mode is set to a very short period to not cause a problem in endurance in the traction motors 30 and 34 and related components. Alternatively, the execution of each third mode may be omitted.

The present embodiment having such a configuration is targeted to solve the following problem. A control may be applied in which, even when the vehicle 10 is positioned on an inclined road, the stopping of the vehicle 10 is maintained by instructing the target velocity to 0 by the left and right levers 80 and 82 and generating a suitable motor torque at the left and right traction motors 30 and 34 to balance with the load, which is also called a powered neutral (or 0-speed control). However, when the powered neutral is executed, for example, in a 3-phase motor, a high current is continuously supplied in a concentrated manner on one or two particular stator coil(s) of one phase or two phases. In this case, there is a possibility that a high current excessively continuously flows in a concentrated manner in a line of a particular phase of the traction motors 30 and 34 or in a switching element such as a transistor or an IGBT of a particular phase of an inverter connected to the traction motors 30 and 34, which results in a possibility of reduction of the lifetime of the components. An object of the present embodiment is to maintain the vehicle 10 at a range near a reference position such as an initial stopping position by supply of electricity to the left and right traction motors 30 and 34 in the lawnmower vehicle and to inhibit the reduction of lifetime of the traction motors 30 and 34 and the related components.

In the present embodiment, the above-described configuration is employed for this purpose. Specifically, with the present embodiment, with the execution of the first and second modes, the vehicle 10 is moved in a reciprocating manner between the reference position (point O of FIG. 11) which is an initial stopping position and a position (point S1 of FIG. 11) which is behind the reference position, so that the excessively continuous flow of high current in a concentrated manner in a particular phase of the traction motors 30 and 34 can be prevented. In this case, as shown in FIG. 12A, in the vehicle 10, the movement distance S first becomes larger on the negative side (that is, the vehicle moves backward) from the position of 0, then becomes larger in the positive side (that is, the vehicle moves forward), and these processes are automatically repeated. Because of this, burnout and degradation of the switching element and the line can be effectively prevented. In addition, the time when the vehicle remains in a range near the reference position can be elongated without operating the left and right electromagnetic brakes 32 and 36, and the operability can be improved. For example, a sudden downward movement or popping out of the vehicle 10 when the electromagnetic brakes 32 and 36 are released can be prevented. As a result, according to the present embodiment, the vehicle 10 can be maintained in a range near the reference position which is the initial stopping position by the supply of electricity to the left and right traction motors 30 and 34, and reduction of the lifetime of the traction motors 30 and 34 and the related components can be inhibited.

In addition, the ECU 50 sets, during execution by the first and second mode executing unit 100, the movement velocity of the vehicle 10 to a velocity less than or equal to a predetermined velocity and the movement distance of the vehicle 10 to a distance less than or equal to a predetermined distance during transitions from the state where the actual velocity of the vehicle 10 is 0 to the first mode and to the second mode respectively. For example, the traction motors 30 and 34 alternately repeat a normal rotation and a reverse rotation with an angular range and period limited with respect to the axle. For example, the rotation of the traction motors 30 and 34 is decelerated by a deceleration mechanism of the motive power transmission mechanism and transmitted through the axle, and the wheels 18 and 20 are rotated. For example, maximum rotational angles of the wheels 18 and 20 for the normal rotation and the reverse rotation may be limited to a small angle of less than 1 rotation of the axle, and the rotational velocities of the wheels 18 and 20 may be limited to a low velocity in which the driver cannot easily recognize the movement of the vehicle 10. The other structures and operations are similar to those of the first embodiment described above with reference to FIGS. 1-6. Alternatively, the present embodiment may be combined with the second embodiment or the third embodiment shown in FIGS. 7-8.

Figure 12B:
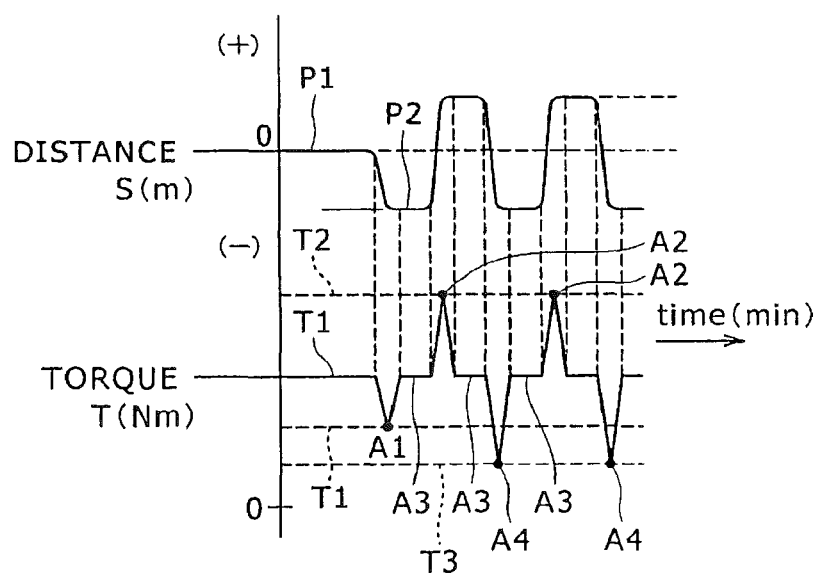
FIG. 12B is a diagram showing a first example of alternative example change with respect to time of the movement distance and the torque instruction of the electric motor when the vehicle of FIG. 11 is controlled by the first and second mode executing unit.

FIG. 12B is a diagram showing a first example of an alternative configuration of a change with respect to time of the movement distance and the torque instruction of the electric motor when the vehicle of FIG. 11 is controlled by the first and second mode executing unit. In the alternative configuration shown in FIG. 12B, the first and second mode executing unit 100 executes, when the target velocity of the vehicle 10 detected by the lever sensors 86 and 88 is 0 and after the actual velocity of the vehicle 10 becomes 0, a small torque mode (state of A1 of FIG. 12B) in which a small torque T1 smaller than the vehicle velocity 0 setting torque T0 is generated in the traction motors 30 and 34, to move the vehicle 10 backward from the reference position (position of point O of FIG. 11) which is the initial stopping position to a rear position (position of point S1 of FIG. 11). Then, the first and second mode executing unit 100 alternately executes the second mode (state of A2 in FIG. 12B) and the first mode (state of A4 in FIG. 12B) in order from the second mode, to control the traction motors 30 and 34 such that the vehicle 10 periodically and repeatedly moves between positions of 2 points (positions of points S2 and S1 in FIG. 11) distanced by an equal distance (L(m)) (for example, a length of less than or equal to 0.5 m) in the front and rear direction from a center at the reference position of the vehicle 10. In this case, as shown in FIG. 12B, the vehicle 10 repeats the reciprocating movement in the front and back of the reference position. Because of this, the time period in which the vehicle remains in a range near the reference position can be elongated without operating the left and right electromagnetic brakes 32 and 36, and the operability can be improved. In addition, the movement velocity of the vehicle is set to a velocity less than or equal to a predetermined velocity (for example, less than or equal to 1 m/min) and the movement distance of the vehicle is set to a distance less than or equal to a predetermined distance (2 L(m)) (for example, less than or equal to 1 m) during the transitions from the state where the actual velocity of the vehicle becomes 0 (state of A3 in FIG. 12B) to the second mode (state of A2 in FIG. 12B) or to the first mode (state of A4 in FIG. 12B). The other structures and operations are similar to those of the structure described above with reference to FIGS. 9-11 and 12A.

Figure 13:
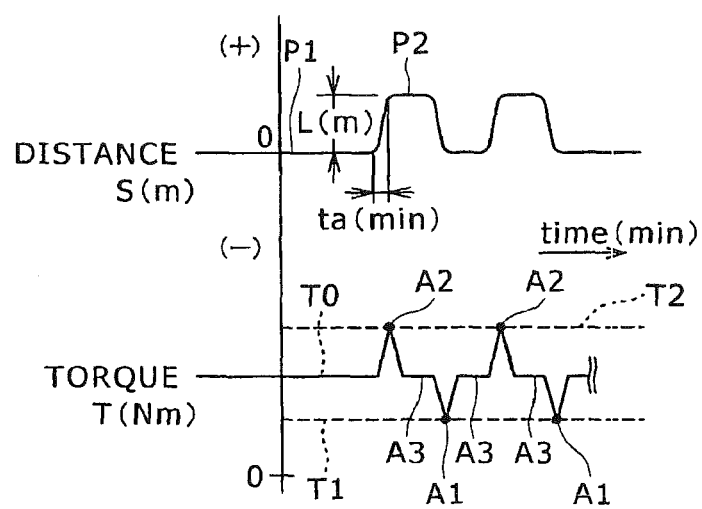
FIG. 13 is a diagram showing a second example of alternative example change with respect to time of the movement distance and the torque instruction of the electric motor when the vehicle of FIG. 11 is controlled by the first and second mode executing unit.

FIG. 13 is a diagram showing a second example of an alternative configuration of a change with respect to time of the movement distance and the torque instruction of the electric motor when the vehicle of FIG. 11 is controlled by the first and second mode executing unit. In the alternative configuration shown in FIG. 13, the first and second mode executing unit 100 alternately executes the second mode (state of A2 in FIG. 13) and the first mode (state of A1 in FIG. 13) when the target velocity of the vehicle 10 detected by the lever sensors 86 and 88 is 0 and after the actual velocity of the vehicle 10 becomes 0, in order from the second mode, and controls the traction motors 30 and 34. In this case, as shown in FIG. 13, in the vehicle 10, the movement distance S (FIG. 11) first becomes larger in the positive side (that is, the vehicle moves forward) from the position of 0, and then, becomes larger in the negative side (that is, the vehicle moves backward), and these processes are automatically alternately repeated. The other structures and operations are similar to those of the structure described above with reference to FIGS. 9-11 and 12A. In addition, the present embodiment is not limited to the ZTR type vehicle and may be applied to vehicles other than the ZTR type vehicle.

Next, an alternative configuration of the fourth embodiment of the present invention will be described with reference to FIGS. 9-11 and 12A. In the lawnmower vehicle 10 of the alternative configuration, as shown in FIG. 10, the ECU 50 has the rotation abnormality processing unit 79 as in the fourth embodiment described above. The lawnmower vehicle 10 is the above-described ZTR type lawnmower vehicle. That is, the left and right traction motors 30 and 34 are motors of a plurality of phases, for example, 3 phases, in which the driving is independently controlled by the ECU 50. In addition, a configuration is allowed in which the operation directions of the left and right levers 80 and 82 are set to opposite directions to set the rotational directions of the left and right traction motors 30 and 34 opposite from each other.

Moreover, the first and second mode executing unit 100 has, in addition to the function of the above-described fourth embodiment, a function to synchronize, between the traction motors 30 and 34, the switching timing of current to be supplied to the stator coils of a plurality of phases of the left and right traction motors 30 and 34. For example, the ECU 50 synchronizes, during the execution of the first and second modes, the switching timings of current to be supplied to the stator coils of U, V, and W phases in the 3-phase traction motors 30 and 34 having the U, V, and W phases, and checks that the actual rotational velocities of the left and right traction motors 30 and 34 match each other based on the detected values of the motor velocity detecting units 108 and 110. Moreover, when a difference between actual rotational velocities of the left and right traction motors 30 and 34 becomes a value greater than or equal to a predetermined value, which is set in advance, after the above-described synchronization of the switching timings of the current, the rotation abnormality processing unit 79 of the ECU 50 supplies electricity or the like to the brake relay 62 (FIG. 2) as an abnormality process, to activate, that is, switch ON, the left and right electromagnetic brakes 32 and 36 which are left and right auxiliary brakes which brake the left and right wheels 18 and 20, respectively.

The alternative configuration of the fourth embodiment having such a structure is targeted to solve the following problem. Specifically, similar to the problem of the fourth embodiment described above, execution of a control called the powered neutral (or 0-speed control) may be considered in the lawnmower vehicle 10. However, when the powered neutral is executed, for example, in a 3-phase motor, a high current is continuously supplied in a concentrated manner in the stator coil (s) of a particular phase or two particular phases. Because of this, there is a possibility that a high current will continue to flow excessively continuously in a concentrated manner in the line of a particular phase of the traction motors 30 and 34 or a switching element such as a transistor or an IGBT of the particular phase of the inverter connected to the traction motors 30 and 34, and the lifetime of the component may be reduced. Because of this, a structure which alternately repeats the normal rotation and the reverse rotation of the left and right traction motors 30 and 34 may be employed as in the fourth embodiment. However, when the left and right traction motors 30 and 34 are independently controlled by the ECU 50, the rotational velocities of the left and right traction motors 30 and 34 may deviate significantly from each other due to disturbance of the road or the like. For example, in the case of the ZTR type vehicle, there is a possibility that the vehicle 10 is oriented in a slanted direction with respect to the intended direction of travel unless the left and right wheels 18 and 20 simultaneously rotate in the same rotational direction and the current flowing in the stator coil is switched at the same switching timing. In this case, the vehicle may move in a direction not intended by the driver. An object of the alternative configuration of the present embodiment is to maintain the vehicle 10 at a range near a reference position such as an initial stopping position by supply of electricity to the left and right traction motors which are controlled independently from each other, inhibit reduction of lifetime of the traction motor and related components, and to prevent movement of the vehicle in an unintended direction.

For this purpose, the present embodiment employs the above-descried structure. That is, according to the present embodiment, the vehicle can be maintained in a range near a reference position which is an initial stopping position by supply of electricity to the left and right traction motors 30 and 34, and the reduction of the lifetime of the traction motors 30 and 34 and the related components can be inhibited. In addition, it is possible to effectively prevent, with activation of the electromagnetic brakes 32 and 36, the vehicle 10 from being oriented in a slanted direction with respect to an intended direction due to a difference in the rotational velocities of the left and right traction motors 30 and 34. The other structures and operations are similar to those of the fourth embodiment described above with reference to FIGS. 9-11 and 12A. In the above description, an example case is described in which the electromagnetic brakes 32 and 36 are employed as the auxiliary brakes, but the present embodiment can be applied to other structures. For example, in a normal hydraulic brake, in a structure which uses an electric hydraulic brake which converts an operation of the brake pedal into an electric signal and electrically pushes or pulls a link of the hydraulic brake, the electric hydraulic brake may be employed as the auxiliary brake.

[Fifth Embodiment]

Figure 14:
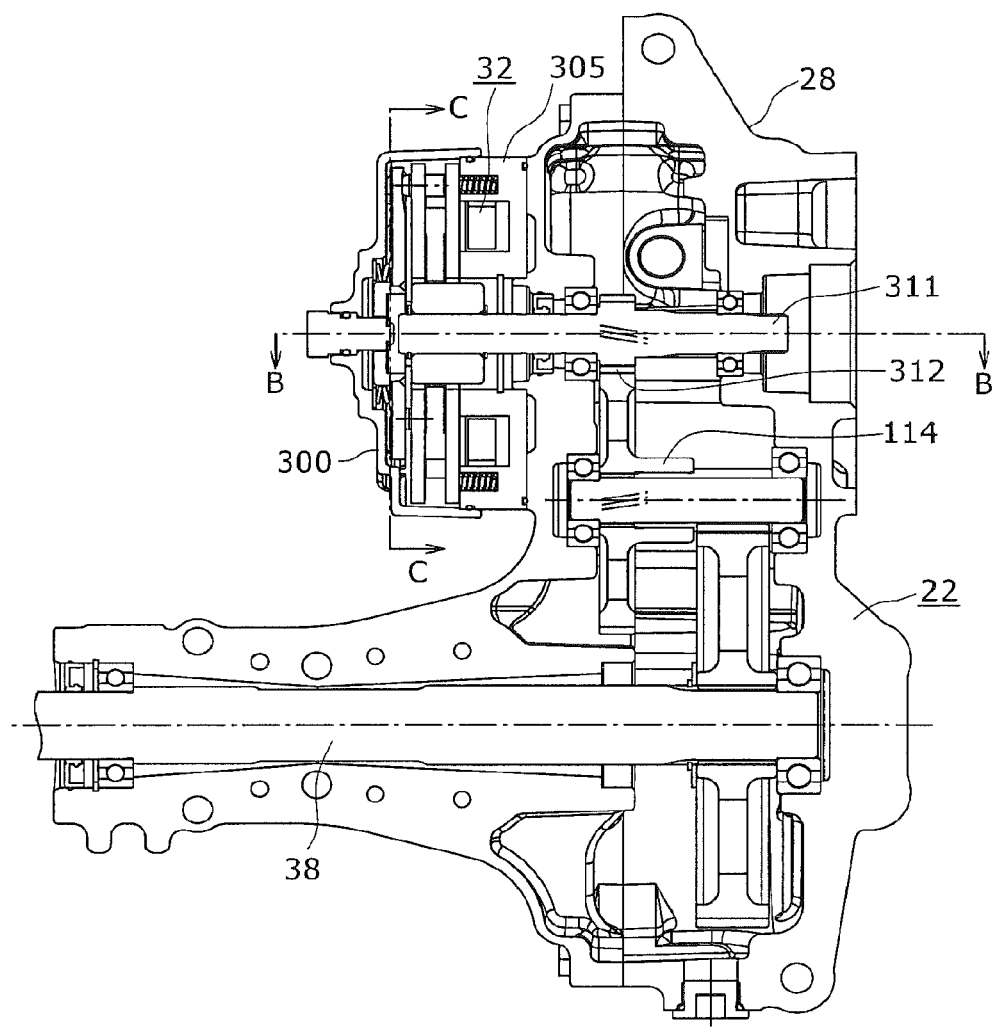
FIG. 14 is a cross sectional diagram showing a power generation unit of a lawnmower vehicle which is a working vehicle with an electromagnetic brake according to a fifth embodiment of the present invention, with the traction motor omitted.
Figure 15:
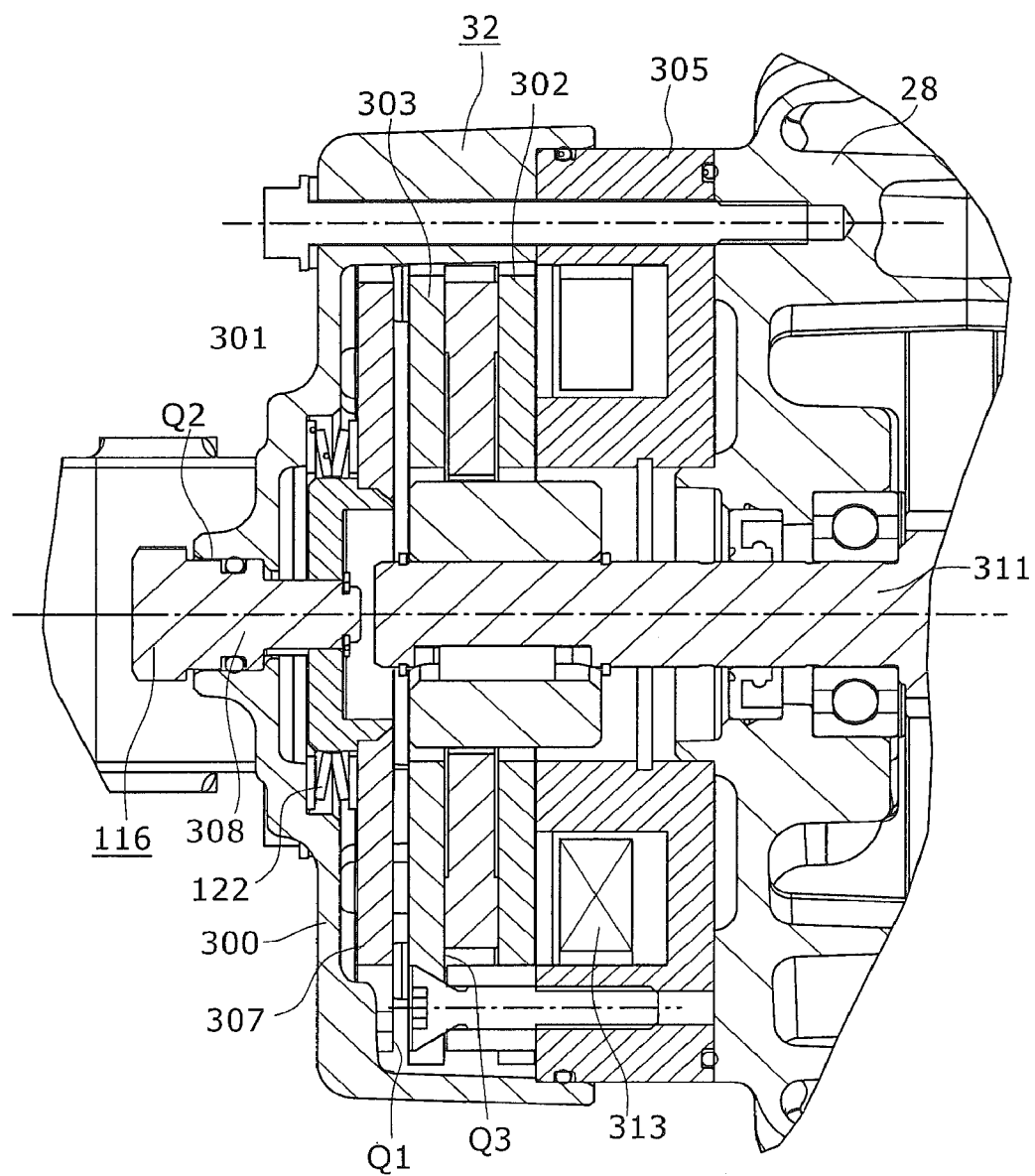
FIG. 15 is a cross sectional diagram along B-B line of FIG. 14.
Figure 16:
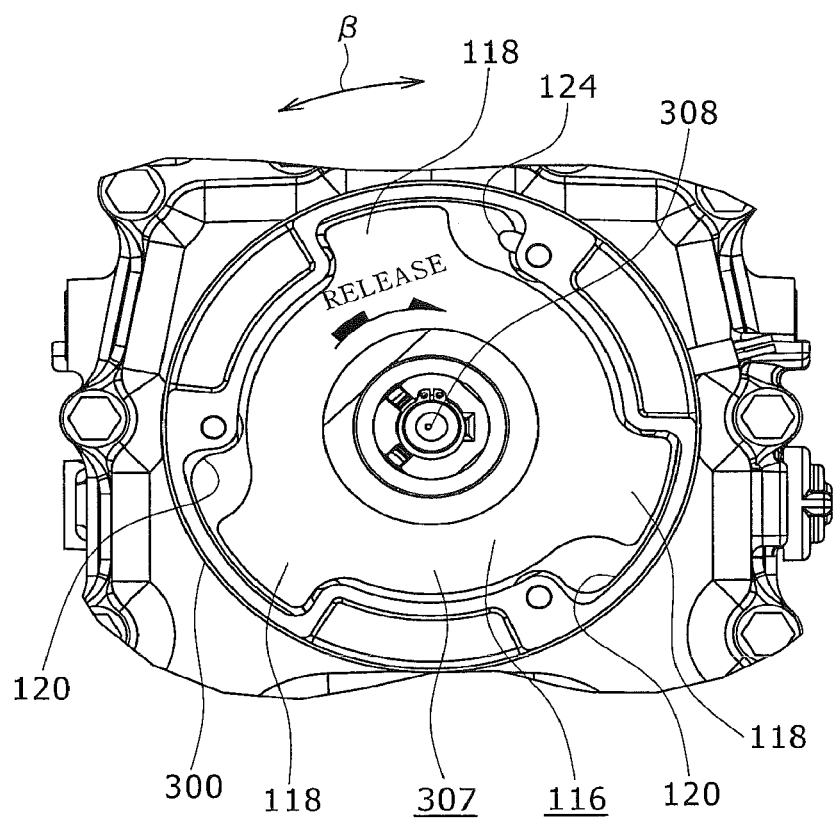
FIG. 16 is a cross sectional diagram along C-C line of FIG. 14.
Figure 17:
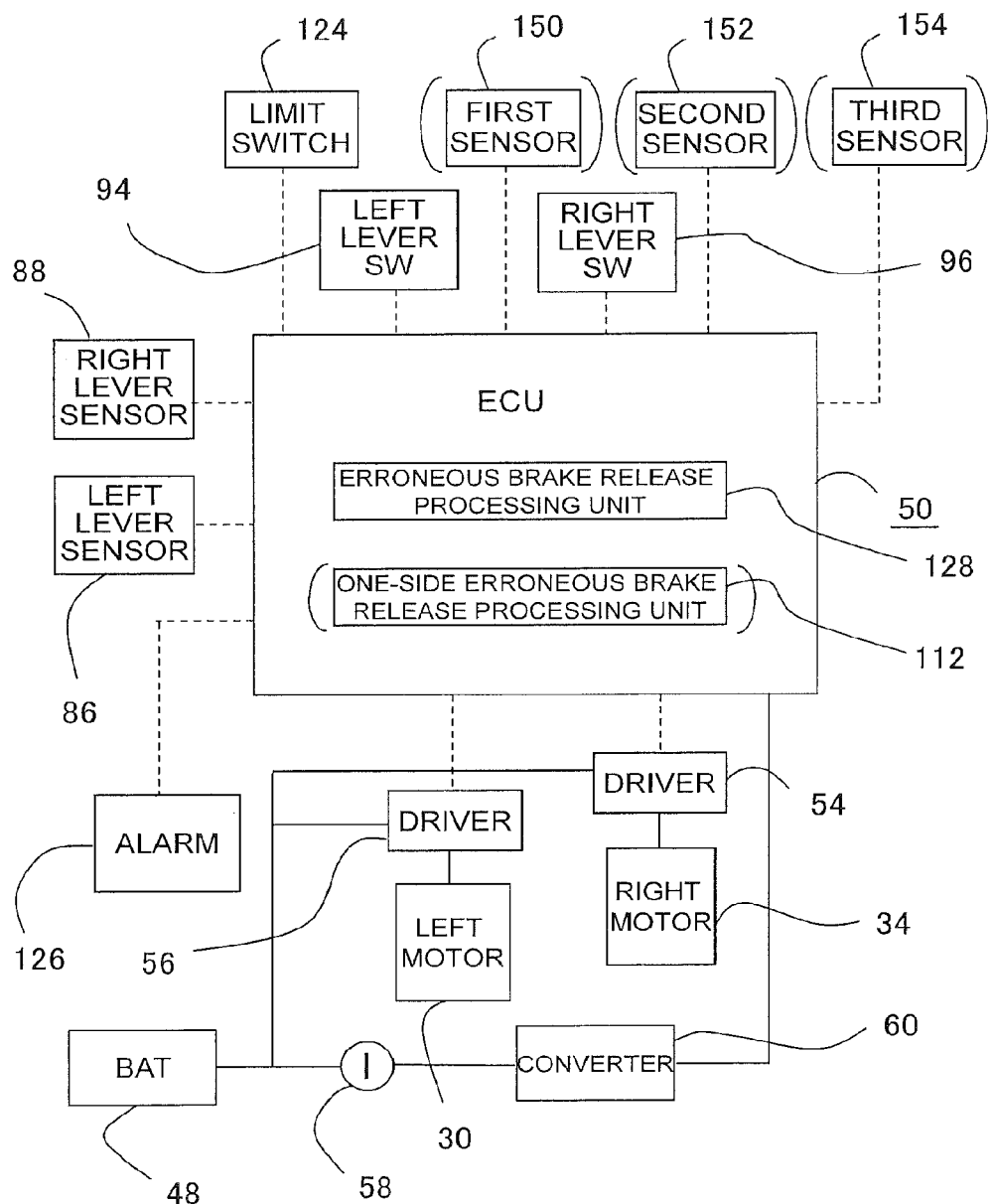
FIG. 17 is a structural diagram showing a plurality of constituent elements of a lawnmower vehicle according to a fifth embodiment of the present invention.

FIG. 14 is a cross sectional diagram showing a power generation unit of a lawnmower vehicle which is a working vehicle with electromagnetic brake according to a fifth embodiment of the present invention, in which the traction motor is omitted. FIG. 15 is a cross sectional diagram along a B-B line of FIG. 14. FIG. 16 is a cross sectional diagram along a C-C line of FIG. 14. FIG. 17 is a structural diagram showing a plurality of constituent elements of the lawnmower vehicle of the present embodiment. FIG. 17 also shows a one-side erroneous brake release processing unit 112 which is a part of an alternative configuration of the present embodiment.

FIG. 14 is a diagram corresponding to the left power generation unit 22 among the left and right power generation units 22 and 24 of the lawnmower vehicle 10 in the first embodiment described above with reference to FIG. 1. The right power generation unit 24 has a similar structure except that the left and right are reversed with respect to the left power generation unit 22. As shown in FIG. 14, the left power generation unit 22 comprises a motive power transmission mechanism 114 including a gear or the like in a casing 28, similar to the left power generation unit 22 of FIG. 1, and transmits the motive power from the corresponding traction motor 30 (FIG. 1) through the motive power transmission mechanism 114 and axle 38 to the wheel 18 (FIG. 1).

The electromagnetic brake 32 is provided in the casing 28 and at a side opposite to the corresponding traction motor 30. The electromagnetic brake 32 comprises a brake casing 305 and a cover 300 fixed on the casing 28, and a rotational shaft 311 connected to a motor shaft (not shown) of the traction motor 30. A small gear 312 of the motive power transmission mechanism 114 is provided at a center portion of the rotational shaft 311.

As shown in FIG. 15, the electromagnetic brake 32 comprises a friction plate 301 which is a rotational member which is supported on the rotational shaft 311 in a manner to be only allowed to move in the axial direction and which rotates in a linked manner with the wheel 18 (FIG. 9), a pair of steel plates 302 and 303 which are supported on the casing 28 in a manner to be only allowed to move in the axial direction and which are placed on both sides of the friction plates 301 and sandwiching the friction plate 301, a coil 313, and a spring 306 (refer to FIG. 6). The coil 313 opposes one steel plate 302 of the pair of steel plates 302 and 303. The spring 306 is provided on the brake casing 305 to oppose the one steel plate 302.

The electromagnetic brakes 32 and 36 (refer to FIG. 1 for 36), each of which is formed as described above, generate an electromagnetic force by supply of electricity from the battery 48 (FIG. 17) to the coil 313, and attracts the one steel plate 302 against the urging force of the spring 306 (FIG. 6). Because of this, when the supply of electricity from the battery 48 to the electromagnetic brakes 32 and 36 is cut off by the switching OFF of the main switch 58 (FIG. 17) or the like, the friction plate 301 is held between the steel plates 302 and 303, and the corresponding one of the wheels 18 and 20 (FIG. 9) is braked. In addition, the spring 306 presses the one steel plate 302 toward the side of the other steel plate 303 so that the pair of steel plates 302 and 303 press the friction plate 301 with the friction plate 301 therebetween during a period when no electricity is supplied to the coil 313. In this case, the friction plate 301 is pressed by cooperation of the pair of the steel plates 302 303, and the wheels 18 and 20 are braked.

In addition, in each of the left and right electromagnetic brakes 32 and 36, a forceful brake releasing unit 116 is provided which forcefully maintains the released state of the brake by the corresponding electromagnetic brakes 32 and 36 even when the supply of electricity from the battery 48 to the electromagnetic brakes 32 and 36 is cut off. The forceful brake releasing unit 116 comprises a stopping plate 307 which opposes the other steel plate 303 and which limits a movement in the axial direction of the other steel plate 303, a pin 310 (refer to FIG. 6), and a brake releasing shaft 308 which is supported by a spline-fit to the center portion of the stopping plate 307 in a manner to be only allowed to be displaced in the axial direction. The brake releasing shaft 308 is fixed the stopping plate 307 by a ring member fixed on the inner end portion (right side portion of FIG. 15) of the brake releasing shaft 308 and an out side spring 122 described below. The brake releasing shaft 308 is rotatably held on the cover 300 and has an external end portion (left end portion of FIG. 15) protruding from the cover 300 to the outside. The outer end portion of the brake releasing shaft 308 can be artificially rotatively operated using a predetermined tool. As shown in FIG. 16, arc portions 118 protruding toward the outside are provided on a plurality of locations (3 locations in FIG. 16) of the outer peripheral surface of the stopping plate 307. Side surfaces of the arc portion 118 in the circumferential direction oppose the side surfaces in the circumferential direction of a recess 120, which is provided to be recessed toward the outside in a plurality of locations on the inner side surface of the cover 300 in the circumferential direction. Because of this, the rotational angle of the stopping plate 307 is restricted. In the present embodiment, the stopping plate 307 corresponds to a movable member.

The stopping plate 307 has a cam groove 309 (refer to FIG. 6) provided on a surface opposing the other steel plate 303. The pin 310 has one end portion inserted into the cam groove 309 and another end portion to be contacted with the one steel plate 302. The cam groove 309 has a depth which gradually changes toward one side in the circumferential direction. When the brake releasing shaft 309 rotates in one direction, the one end of the pin 310 moves over the shallow portion of the cam groove 309, the other end of the pin 310 pushes back the one steel plate 302 against the urging force of the spring, the pressing of the friction plate 301 by the pair of steel plates 302 and 303 is forcefully released, and the braking of the electromagnetic brakes 32 and 36 is forcefully released. In addition, an outside spring 122 is provided between the stopping plate 307 and the cover 300, so that the outside spring 122 presses the stopping plate 307 toward the side of the other steel plate 303. Because of this structure, even when a defect of supply of electricity or the like to the traction motors 30 and 34 (FIG. 9) and the coil 313 occurs, the user can forcefully release the braking of the left and right wheels 18 and 20 (FIG. 9) using the forceful brake releasing unit 116, and therefore the vehicle 10 (FIG. 9) can be easily towed. Alternatively, the cam groove may be provided at a plurality of locations in the circumferential direction of the stopping plate 307, and the pins 310 may be provided in the same number as the cam grooves.

As shown in FIG. 16 by an arrow β, the stopping plate 307 can be rotated on both sides within a certain angle range, and the rotational position changes between "brake permitted time" and "forceful brake released time". During the "brake permitted time", when the supply of electricity to the electromagnetic brakes 32 and 36 is cut off, the electromagnetic brakes 32 and 36 may be activated or switched ON. During the "forceful brake released time", the brake is forcefully released by the forceful brake releasing unit 116 as described above. FIG. 16 shows the brake permitted time. When the stopping plate 307 is rotated from the state of FIG. 16 to the front side in the clockwise direction and reaches a side surface of a corresponding recess 120, the forceful brake released time is realized.

The forceful brake releasing unit 116 also comprises a limit switch 124 which is a movable member position sensor provided at a portion opposing a one-side surface in the circumferential direction (front side surface in clockwise direction in FIG. 16) of the arc portion 118 of the stopping plate 307 in one of recesses 120 provided inside the cover 300. The limit switch 124 detects a position of the stopping plate 307 which changes to different positions between the forceful brake released time and the brake permitted time. The limit switch 124 detects whether or not the rotational angle of the stopping plate 307 is greater than or equal to a predetermined value. Specifically, the limit switch 124 detects that the rotational angle of the stopping plate 307 is greater than or equal to the predetermined value when the stopping plate 307 rotates and the limit switch 124 is switched ON by the corresponding arc portion 118 pushing the switch 124, and inputs a signal indicating the switching ON of the switch 124 to the ECU 50 (FIG. 17). The limit switch 124 may be provided at a portion opposing a one-side surface in the circumferential direction of the arc portion 118 of the stopping plate 307 in each recess 120.

The lawnmower vehicle also comprises an alarm unit 126 having an alarm sound generation unit which generates an alarm sound such as a buzzer sound or an announcement during an alarm, a light-emitting unit such as an LED which is turned ON or blinked during an alarm, or a display unit such as a liquid crystal unit which displays an alarm display during an alarm.

As shown in FIG. 17, the ECU 50 comprises an erroneous brake release processing unit 128. The main switch 58 is connected between the battery 48 and the ECU 50. The main switch 58 is switched between ON and OFF by an operation of the driver, to switch supply and disconnection of the electric power from the battery 48 to the ECU 50. The erroneous brake release processing unit 128 activates the alarm unit 126 when the maintaining of the braking of the left and right wheels 18 and 20 is instructed by an operation of the left and right levers 80 and 82 (FIG. 9) or the like in the ON state of the main switch 58, for example, when the neutral switches 94 and 96 are switched ON, and when it is judged that at least one electromagnetic brake 32 (or 36) among the electromagnetic brakes 32 and 36 is in the forceful brake release state based on the detected position of each stopping plate 307 corresponding to the signal of the limit switch 124. In addition, the erroneous brake release processing unit 128 prohibits driving of the traction motors 30 and 34 regardless of presence or absence of an operation of the left and right levers 80 and 82 in such a case. Such a function of the erroneous brake release processing unit 128 is realized by one or both of software and an electronic circuit.

Specifically, with the switching ON of the main switch 58, the ECU 50 is supplied with electric power from the battery 48 and is started up. The signal which indicates the switching ON of the neutral switches 94 and 96 by the operation of the left and right levers 80 and 82 is input to the ECU 50. In this case, during the normal time, even if the main switch 58 is in the ON state, if the neutral switches 94 and 96 are in the ON state, the ECU 50 switches the brake relay 62 (FIG. 2) OFF, supply of electric power from the battery 48 to the electromagnetic brakes 32 and 36 is cut off, and with the switching ON of the electromagnetic brakes 32 and 36, braking of the wheels 18 and 20 (FIG. 9) is maintained. On the other hand, in the configuration where She forceful brake forceful releasing unit 116 is provided as described above, in the OFF state of the main switch 58, the braking of the wheels 18 and 20 by the electromagnetic brakes 32 and 36 can be forcefully released by the user with a rotation of the brake releasing shaft 308. However, when the vehicle is to be re-started after the brake is forcefully released, there is a possibility that the user will forget to return the vehicle to the brake permitted state (state of FIG. 16) by rotating the brake releasing shaft 308. In this case, if the traction motors 30 and 34 can be driven, the vehicle can travel as in the normal state, but when the activation of the electromagnetic brakes 32 and 36 is required, there is a possibility that the vehicle cannot be braked. An object of the lawnmower vehicle of the present embodiment is to effectively prevent traveling of the vehicle in the forceful brake released state of the electromagnetic brake.

For this purpose, the present embodiment employs the above-described configuration. Specifically, according to the present embodiment, even if the user erroneously attempts to re-start the vehicle in a state where the forceful brake release of the electromagnetic brakes 32 and 36 is executed for towing or the like of the vehicle, the erroneous brake release processing unit 128 of the ECU 50 judges that the main switch 58 is in the ON state, the neutral switches 94 and 96 are switched ON, and at least one electromagnetic brake 32 (or 36) among the left and right electromagnetic brakes 32 and 36 is in the forceful brake released state based on the detected rotational position of the stopping plate 307. In this case, the erroneous brake release processing unit 128 activates the alarm unit 126, and prohibits the driving of the traction motors 30 and 34. Because of this, the user can recognize that the vehicle is left in the forceful brake released state and the traveling of the vehicle is prohibited, and therefore the traveling in the forceful brake released state of the electromagnetic brakes 32 and 36 can be effectively prevented. The user may rotate the brake releasing shaft 308 in a direction to permit braking in a state where the main switch 58 is switched OFF, to achieve a brake permitted state, and switch the main stitch 58 ON again, so that a normal traveling control of the vehicle is allowed.

Figure 18:
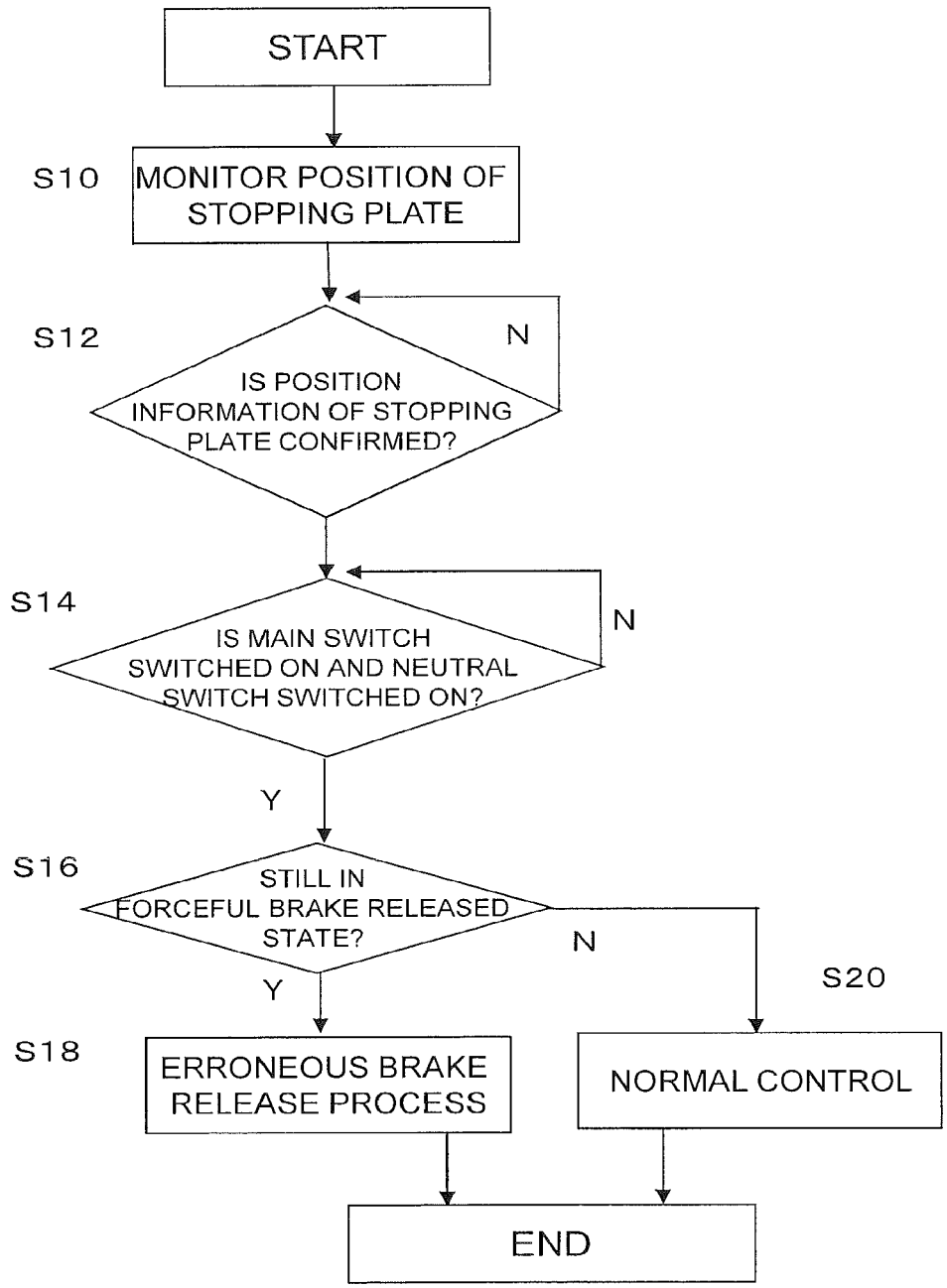
FIG. 18 is a diagram showing a flowchart showing a judging method of a forceful brake release in the fifth embodiment of the present invention.

FIG. 18 is a diagram showing a flowchart showing a judging method of the forceful brake release in the present embodiment. In the following description, the elements identical to the elements shown in FIGS. 14-17 are assigned the same reference numeral and described. In S10, the position of the stopping plate 307 is monitored by the limit switch 124 which is a movable member position sensor, and in S12, it is checked whether or not the position information of the stopping plate 307 is obtained by the ECU 50. When the position information of the stopping plate 307 is confirmed in S12, it is judged in S14 whether or not the main switch 58 is switched ON. When the main switch 58 is switched ON and the neutral switches 94 and 96 are in the ON state, in S16, it is checked whether or not the vehicle is still in the forceful brake released state based on the position information of the stopping plate 307, and if the vehicle is still in the forceful brake released state, the above-described erroneous brake releasing process is executed, the alarm unit 126 is activated, and driving of the traction motors 30 and 34 is prohibited. If, on the other hand, it is judged that the vehicle is not still in the forceful brake released state in S16, a normal control is applied in S20.

Figure 19:
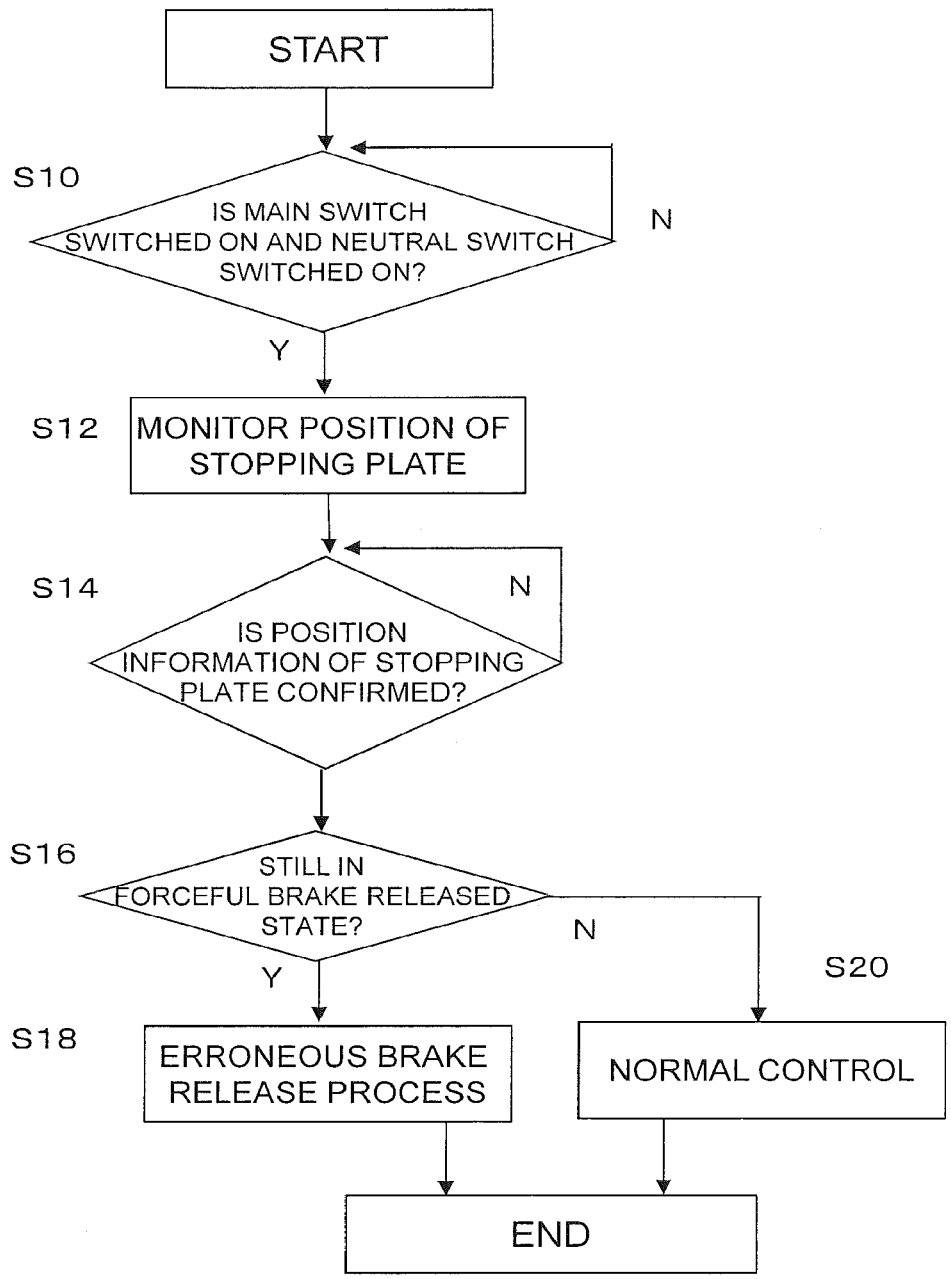
FIG. 19 is a diagram showing a flowchart showing another judging method of the forceful brake release in the fifth embodiment of the present invention.

Alternatively, the judgment of the forceful brake release may be executed by another method. FIG. 19 is a diagram showing a flowchart of another judging method of the forceful brake release in the present embodiment. In the case of the method of FIG. 19, after it is confirmed that the main switch 58 is switched ON and the neutral switches 94 and 96 are switched ON (S10) in the method of FIG. 18, the position of the stopping plate 307 is monitored and then the position information of the stopping plate 307 is confirmed. The steps of S16, S18, and S20 are similar to the steps in the method of FIG. 18 described above.

In addition, in the above-described configuration, the limit switch 124 is used as the movable member position sensor and the limit switch 124 detects whether or not the rotational angle of the stopping plate 307, which is the movable member, is greater than or equal to a predetermined value. Alternatively, the movable member position sensor may be another sensor, for example, a noncontact sensor such as a gap sensor which detects a distance between two objects, or a rotational angle sensor. For example, a first sensor 150 which is provided on the cover 300 or on a member fixed on the cover 300 (for example, at a position of Q1 in FIG. 15), and which detects a distance between the cover 300 or the member fixed on the cover 300 and one of the pair of the steel plates 302 and 303, for example, the other steel plate 303, may be employed as the movable member position sensor. In this case, one of the pair of the steel plates 302 and 303 corresponds to the movable member.

In addition, as an alternative configuration, for example, a second sensor 152 which is provided at a portion opposing the brake releasing shaft 308 on the cover 300 (for example, a position of Q2 in FIG. 15) and which detects the rotational angle of the brake releasing shaft 308 may be used as the movable member position sensor. Alternatively, a second sensor 152 which is a gap sensor may be provided in place of the limit switch 124 and the second sensor 152 may be used as the movable member position sensor which detects the rotational angle of the stopping plate 307. In these cases, the brake releasing shaft 308 or the stopping plate 307 corresponds to the movable member. Alternatively, a third sensor 154 which is provided on one of the pair of the steel plates 302 and 303, for example, on the other steel plate 303 (for example, at a position of Q3 in FIG. 15), and which detects a distance between the pair of steel plates 302 and 303 may be used as the movable member position sensor. In this case, the other steel plate 303 corresponds to the movable member. The other structures and operations are similar to those of the fourth embodiment described above with reference to FIGS. 9-11 and 12A. The present embodiment is not limited to the ZTR type vehicle, and may be applied to a vehicle other than the ZTR type vehicle. For example, the present embodiment may be applied to a vehicle in which the steering operator and an accelerator pedal are provided, as described in relation to the first embodiment shown in FIG. 1.

In addition, in the above description, a configuration is described in which the left and right levers 80 and 82 are used as the brake maintaining instruction provider, but the present embodiment is not limited to such a configuration. For example, a parking lever which can be reciprocated may be provided at a periphery section of the seat, and the parking lever may be used as the brake maintaining instruction provider. For example, it may be judged that maintaining of the braking of the wheel is instructed when the parking lever is pulled, the pulling operation may be detected by the lever switch and the detected signal may be input to the ECU.

In the fifth embodiment described above, as an alternative configuration, a configuration may be employed in which the ECU 50 comprises the one-side erroneous brake release processing unit 112 (FIG. 17) in place of the erroneous brake release processing unit 128. Specifically, the one-side erroneous brake release processing unit 112 activates the alarm unit 126 when maintaining of the brake of the left and right wheels 18 and 20 (FIG. 9) is instructed by an operation of the left and right levers 80 and 82 (FIG. 9) or the like in the ON state of the main switch 58, for example, when the neutral switches 94 and 96 are switched ON, and when it is judged that only one of the electromagnetic brakes 32 and 36 (refer to FIG. 2 for reference numeral 36) is in the forceful brake released state based on the detected position of the movable member corresponding to a signal of the movable member position sensor such as the limit switch 124. In addition, the one-side erroneous brake release processing unit 112 prohibits driving of the traction motors 30 and 34 regardless of whether or not the left and right levers 80 and 82 have been operated in such a case. The left and right traction motors 30 and 34 are independently controlled by the ECU 50. The lawnmower vehicle of the present embodiment is the ZTR type vehicle as described above.

In the present embodiment, an object is to solve the following problem in addition to the above-described object of the fifth embodiment. When the left and right traction motors 30 and 34 are independently controlled, particularly in the case of the ZTR type vehicle, there is a possibility that the user will forget to return only one of the left and right electromagnetic brakes 32 and 36 from the forceful brake released state to the brake permitted state during the re-starting of the vehicle. In this case, braking of only the wheel 18 (or 20) (FIG. 9) of one side corresponding to the one electromagnetic brake 32 or 36 is permitted, but when only one wheel 18 (or 20) is braked during braking of the vehicle, there is a possibility that the vehicle will turn in an unintended direction. Therefore, such a state needs to be avoided. For this purpose, as in the alternative configuration of the fifth embodiment as described above, a configuration is employed in which the one-side erroneous brake release processing unit 112 is provided. According to such a configuration, even when the user erroneously attempts to re-start the vehicle while only the electromagnetic brake 32 (or 36) of one side is in the forceful brake released state, the one-side erroneous release processing unit 112 activates the alarm unit 126 and prohibits the driving of the traction motors 30 and 34. Because of this structure, traveling in a state where only one of the left and right electromagnetic brakes 32 and 36 is in the forceful brake released state can be effectively prevented. The other structures and operations are similar to those of the fifth embodiment described above with reference to FIGS. 14-19.

[Sixth Embodiment]

Figure 20:
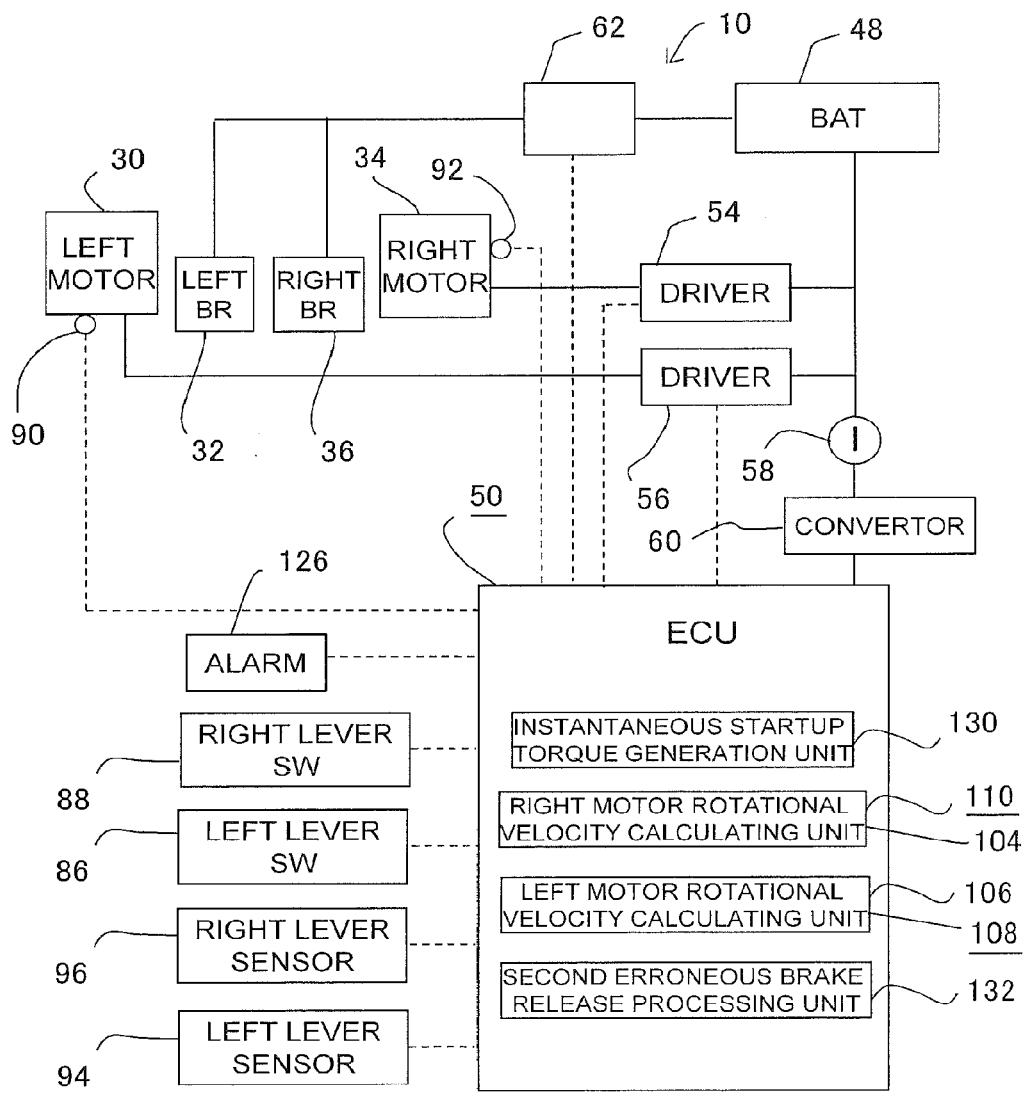
FIG. 20 is a structural diagram showing a plurality of constituent elements of a lawnmower vehicle which is a working vehicle with an electromagnetic brake according to a sixth embodiment of the present invention.

FIG. 20 is a structural diagram showing a plurality of constituent elements of a lawnmower vehicle which is a working vehicle with electromagnetic brake according to a sixth embodiment of the present invention. The lawnmower vehicle 10 of the present embodiment comprises left and right rotational angle sensors 90 and 92 which detect the rotational angles of the left and right traction motors 30 and 34, respectively, similar to the fourth embodiment described above with reference to FIGS. 9-11 and 12A. In addition, the left and right motor rotational velocity calculating units 106 and 104 of the ECU 50 and the left and right motor rotational angle sensors 90 and 92 form left and right motor velocity detecting units 108 and 110, respectively. The ECU 50 also comprises an instantaneous startup torque generation unit 130 and a second erroneous brake release processing unit 132. Moreover, similar to the fifth embodiment described above with reference to FIGS. 14-18, the lawnmower vehicle 10 comprises the forceful brake releasing unit 116 (FIG. 15) provided on each of the left and right electromagnetic brakes 32 and 36.

The instantaneous startup torque generation unit 130 generates an instantaneous startup torque which is set in advance in the traction motors 30 and 34 when maintaining of the braking of the wheels 18 and 20 (FIG. 9) is instructed by an operation of the left and right levers 80 and 82 (FIG. 9) which are brake maintaining instruction providers while the main switch 58 is in the ON state. The "instantaneous startup torque" is, for example, a torque necessary for rotating the traction motors 30 and 34 by a very small angle of a degree such that the vehicle does not travel, that is, a degree of about the backlash at the gears of the motive power transmission mechanism which transmits the motive power of the traction motors 30 and 34 to the wheels 18 and 20. The second erroneous brake release processing unit 132 activates the alarm unit 126 and prohibits the driving of the traction motors 30 and 34 when the instantaneous startup torque is generated in the traction motors 30 and 34 and the detected value or values of the rotational angle or angles of one or both of the traction motors 30 and 34 is greater than or equal to a predetermined value which is set in advance. This function of the second erroneous brake release processing unit 132 is realized by one or both of software and an electrical circuit.

The present embodiment is targeted to solving a problem similar to the problem solved by the fifth embodiment described above with reference to FIGS. 14-19. That is, an object of the lawnmower vehicle 10 of the present embodiment is to effectively prevent traveling of the vehicle in the forceful brake released state of the electromagnetic brakes 32 and 36.

For this purpose, the present embodiment employs the above-described configuration. That is, according to the present embodiment, when the user attempts to re-start the vehicle while forgetting to return the vehicle from the forceful brake released state to the brake permitted state, the instantaneous startup torque is given in the ON state of the main switch 58, but when at least one of the electromagnetic brakes 32 and 36 is in the forceful brake released state, the rotational angle of the traction motor 30 or 34 becomes greater than or equal to the predetermined value due to the driving by the corresponding traction motor 30 or 34. Thus, the second erroneous brake release processing unit 132 activates the alarm unit 126 and prohibits the driving of the traction motors 30 and 34. Therefore, traveling of the vehicle in the forceful brake released state of the electromagnetic brakes 32 and 36 can be effectively prevented. The other structures and operations are similar to those of the fourth embodiment described above with reference to FIGS. 9-11 and 12A or those of the fifth embodiment described above with reference to FIGS. 14-19.

In the above description, the second erroneous brake release processing unit 132 is described to activate the alarm unit 126 and prohibit the driving of the traction motors 30 and 34 when the above-described instantaneous startup torque is generated in the traction motors 30 and 34 and the detected value of the rotational angle of at least one of the traction motors 30 and 34 is greater than or equal to the predetermined value. Alternatively, when the vehicle is the above-described ZTR type vehicle, an alternative configuration may be employed in which the second erroneous brake release processing unit 132 activates the alarm unit 126 and prohibits the driving of the traction motors 30 and 34 when the above-described instantaneous startup torque is generated in the traction motors 30 and 34 and the detected value of the rotational angle of only one of the traction motors 30 and 34 is greater than or equal to the predetermined value. More specifically, during braking and re-starting of the vehicle, there is a possibility that the user will forget to return only one electromagnetic brake 32 (or 36) of the left and right electromagnetic brakes 32 and 36 from the forceful brake released state to the brake permitted state. In this case, in a ZTR type vehicle, only one wheel 18 (or 20) corresponding to the one electromagnetic brake 32 (or 36) is not braked and is rotated, which may result in the vehicle turning in an unintended direction. On the other hand, when the above-described structure of the alternative configuration is employed, even if the user erroneously attempts to re-start the vehicle in a state where only one of the electromagnetic brakes 32 and 36 is in the forceful brake released state, the second erroneous brake release processing unit 132 activates the alarm unit 126 and prohibits driving of the traction motors 30 and 34. Because of this configuration, traveling of the vehicle in a state where only one of the left and right electromagnetic brakes 32 and 36 is in the forceful brake released state can be effectively prevented.

What is claimed is:

1. A working vehicle with an electromagnetic brake, comprising:
    a left wheel and a right wheel which are drive wheels driven for travel by a left traction motor and a right traction motor, respectively;
    a working machine which is driven for executing ground work;
    a left electromagnetic brake and a right electromagnetic brake provided corresponding to the left wheel and the right wheel, respectively, and which execute a brake release operation of the left wheel and the right wheel by supply of electricity from a power supply, and execute a brake operation of the left wheel and the right wheel when the supply of electricity from the power supply is cut off;
    a common brake releasing unit which is common to the left electromagnetic brake and the right electromagnetic brake and which electrically connects the power supply and the left electromagnetic brake and the right electromagnetic brake to supply electricity from the power supply to the left electromagnetic brake and the right electromagnetic brake when a brake release instruction is obtained; and
    a controller which controls the common brake releasing unit, wherein
    the controller compares electricity supply states of the left electromagnetic brake and the right electromagnetic brake, and controls the common brake releasing unit to disconnect an electrical connection between the power supply and the left electromagnetic brake and the right electromagnetic brake, and to brake the left wheel and the right wheel, when a difference between the compared electricity supply states exceeds an allowable upper limit.

2. The working vehicle with an electromagnetic brake according to claim 1, wherein
    the controller comprises:
    a comparator which compares the electricity supply states of the left electromagnetic brake and the right electromagnetic brake, and
    a common release control unit which controls the common brake releasing unit to disconnect the electrical connection between the power supply and the left electromagnetic brake and the right electromagnetic brake, and to brake the left wheel and the right wheel, when a difference between the electricity supply states compared in the comparator exceeds the allowable upper limit.

3. The working vehicle with an electromagnetic brake according to claim 2, further comprising:
    a left brake current sensor and a right brake current sensor which detect an amount of supply of electricity for the left electromagnetic brake and the right electromagnetic brake, respectively, wherein
    the comparator compares the electricity supply states of the left electromagnetic brake and the right electromagnetic brake based on detected signals of the current sensors.

4. The working vehicle with an electromagnetic brake according to claim 2, wherein
    the controller comprises a storage unit which stores changes with respect to time of a left brake electricity supply current and a right brake electricity supply current which are the electricity supply states for the left electromagnetic brake and the right electromagnetic brake, and
    the comparator compares the changes with respect to time of the left brake electricity supply current and the right brake electricity supply current stored in the storage unit.

5. The working vehicle with an electromagnetic brake according to claim 1, wherein
    the left traction motor and the right traction motor are a left electric motor and a right electric motor, driving of which is controlled by the controller, the working vehicle with electromagnetic brake further comprises:

an acceleration operator which instructs a target velocity of the vehicle; and an operator sensor which detects an amount of operation of the acceleration operator, and the controller comprises:

a torque calculating unit which calculates a vehicle velocity 0 setting torque to be generated in the electric motor necessary for maintaining the velocity of the vehicle at 0 when the target velocity detected by the operator sensor is 0; and a first and second mode executing unit which controls each of the electric motors to alternately execute, when the target velocity is 0 and after an actual velocity of the vehicle becomes 0, a first mode in which a first torque smaller than the vehicle velocity 0 setting torque is generated in each of the electric motors, and a second mode in which a second torque larger than the vehicle velocity 0 setting torque is generated in each of the electric motors, so that a movement of the vehicle between positions of 2 points apart in a front and rear direction is periodically repeated.

6. The working vehicle with an electromagnetic brake according to claim 5, wherein during the execution by the first and second mode executing unit, the controller sets a movement velocity of the vehicle to a velocity less than or equal to a predetermined velocity, and sets a movement distance of the vehicle to a distance less than or equal to a predetermined distance, during a transition from a state where the actual velocity of the vehicle becomes 0 to the execution of the first mode or the second mode.

7. The working vehicle with an electromagnetic brake according to claim 6, further comprising:

a left motor velocity detecting unit and a right velocity detecting unit which detect rotational velocities of the left electric motor and the right electric motor, respectively, wherein the controller comprises a velocity and distance calculating unit which calculates the movement velocity and the movement distance based on detected rotational velocity of each of the electric motors.

8. The working vehicle with an electromagnetic brake according to claim 5, wherein the left electric motor and the right electric motor are multiple-phase motors which are driven and controlled independently by the controller, the first and second mode executing unit synchronizes current switching timings of the multiple phases of the left electric motor and the right electric motor between the electric motors, and the controller further comprises a rotation abnormality processing unit which activates, as a process at a time of abnormality, a left auxiliary brake and a right auxiliary brake which brake the left wheel and the right wheel, respectively, when a difference in actual rotational velocities between the left electric motor and the right electric motor becomes greater than or equal to a predetermined value after synchronization of the current switching timings.

9. The working vehicle with an electromagnetic brake according to claim 8, wherein the left auxiliary brake and the right auxiliary brake are the left electromagnetic brake and the right electromagnetic brake.

10. The working vehicle with an electromagnetic brake according to claim 1, wherein the left traction motor and the right traction motor are a left electric motor and a right electric motor, driving of which is controlled by the controller, the working vehicle with an electromagnetic brake further comprises a brake maintaining instruction provider which instructs cutting of supply of electricity to the electromagnetic brake to maintain braking of the left wheel and the right wheel;

a main switch which is connected between the power supply and the controller and which switches between supply and disconnection of electric power from the power supply to the controller in response to an operation; and a forceful brake releasing unit which is provided in each of the left electromagnetic brake and the right electromagnetic brake and which maintains a state where the braking by the corresponding electromagnetic brake is forcefully released even when the supply of electricity from the power supply to each of the electromagnetic brakes is cut off, the forceful brake releasing unit comprises a movable member position sensor which detects a position of a movable member which changes to different positions between a forceful brake released time and a brake permitted time, and the controller comprises an erroneous brake release processing unit which activates an alarm unit and prohibits the driving of each of the electric motors when maintaining of the barking of the wheel is instructed by an operation of the brake maintaining instruction provider in an ON state of the main switch, and when it is judged that at least one electromagnetic brake electromagnetic brake among the electromagnetic brakes is in a forceful brake released state based on a detected position of each of the movable members.

11. The working vehicle with an electromagnetic brake according to claim 10, wherein the electromagnetic brake comprises a rotational member which rotates in a linked manner with the wheel, a pair of steel plates placed on both sides of the rotational member and sandwiching the rotational member, a coil which opposes one steel plate of the pair of steel plates and which attracts the one steel plate by supply of electricity, and a spring which opposes the one steel plate so that when no electricity is applied to the coil, the pair of steel plates sandwich and press the rotational member, the forceful brake releasing unit comprises:

a brake releasing shaft which is rotatably held on a cover of the electromagnetic brake; and a stopping plate which is placed within the cover and which rotates in a linked manner with the brake releasing shaft, the stopping plate comprises a cam groove provided on a surface opposing the other steel plate of the pair of steel plates, and a pin having one end inserted into the cam groove and the other and opposing the one steel plate, wherein, with a rotation of the brake releasing shaft, the other end of the pin forcefully releases the pressing of the rotational member by the pair of steel plates against an urging force of the spring, and the movable member position sensor is one of a first sensor which detects a distance between the cover or a member fixed on the cover and one of the pair of steel plates, a second sensor which detects a rotational angle of the brake releasing shaft or the stopping plate, a third sensor which detects a distance between the pair of steel plates, and a limit switch which detects whether or not the rotational angle of the stopping plate is greater than or equal to a predetermined value.

12. The working vehicle with an electromagnetic brake according to claim 1, wherein
the left traction motor and the right traction motor are a left electric motor and a right electric motor, driving of which is controlled by the controller,
the working vehicle with electromagnetic brake further comprises:
a brake maintaining instruction provider which instructs maintaining of brake of the left wheel and the right wheel by cutting supply of electricity to the electromagnetic brake;
a main switch which is connected between the power supply and the controller and which switches between supply and disconnection of electric power from the power supply to the controller by an operation;
a forceful brake releasing unit which is provided in each of the left electromagnetic brake and the right electromagnetic brake, and which maintains a state where the braking by the corresponding electromagnetic brake is forcefully released even when the supply of electricity from the power supply to each of the electromagnetic brakes is cut off; and
a left rotational angle sensor and a right rotational angle sensor which detect rotational angles of the left electric motor and the right electric motor, respectively, and
the controller comprises:
an instantaneous startup torque generation unit which generates an instantaneous startup torque in each of the electric motors when maintaining of the braking of the wheel is instructed by an operation of the brake maintaining instruction provider in an ON state of the main switch; and
a second erroneous brake release processing unit which activates an alarm unit and prohibits the driving of the electric motors when the instantaneous startup torque is generated and a detected value of the rotational angle of at least one electric motor among the electric motors is greater than or equal to a predetermined value.

* * * * *